US008175209B2

(12) United States Patent
Auchterlonie

(10) Patent No.: US 8,175,209 B2
(45) Date of Patent: May 8, 2012

(54) METHOD AND APPARATUS FOR PULSED POWER GENERATION

(76) Inventor: Richard Carl Auchterlonie, Houston, TX (US)

( * ) Notice: Subject to any disclaimer, the term of this patent is extended or adjusted under 35 U.S.C. 154(b) by 331 days.

(21) Appl. No.: 12/637,711

(22) Filed: Dec. 14, 2009

(65) Prior Publication Data

US 2010/0090539 A1    Apr. 15, 2010

Related U.S. Application Data

(63) Continuation-in-part of application No. 10/599,251, filed as application No. PCT/US2005/009723 on Mar. 23, 2005, now Pat. No. 7,634,042.

(60) Provisional application No. 60/555,937, filed on Mar. 24, 2004.

(51) Int. Cl.
*H05H 1/16* (2006.01)

(52) U.S. Cl. ........ 376/141; 376/144; 376/142; 376/143; 315/111.51; 315/111.41; 315/350; 315/128; 307/106; 307/104; 307/113

(58) Field of Classification Search ............ 315/111.21, 315/111.41, 111.51, 127, 128, 290, 291, 315/344, 349, 350; 376/141–145; 307/104, 307/106, 108, 113
See application file for complete search history.

(56) References Cited

U.S. PATENT DOCUMENTS

| | | | | |
|---|---|---|---|---|
| 4,406,952 A * | 9/1983 | Molen et al. | .................. | 307/104 |
| 4,446,096 A * | 5/1984 | Auchterlonie | ................ | 376/145 |
| 4,812,715 A * | 3/1989 | Mendel | ......................... | 315/340 |
| 5,835,545 A * | 11/1998 | Turchi | ........................... | 376/145 |
| 6,066,901 A * | 5/2000 | Burkhart et al. | ............. | 307/106 |
| 6,304,042 B1* | 10/2001 | Savage et al. | ................ | 315/340 |
| 7,634,042 B2* | 12/2009 | Auchterlonie | ............... | 376/141 |

* cited by examiner

*Primary Examiner* — Haiss Philogene
(74) *Attorney, Agent, or Firm* — Richard Auchterlonie

(57) ABSTRACT

Respective pulsed power supplies for plasma opening switches each produce a first current and a second current during a power pulse and a difference between the first current and the second current during a terminal portion of the power pulse. The pulsed power supplies are initiated or adjusted in response to measured opening times of the plasma opening switches in order to minimize or eliminate a need for command triggered opening of the plasma opening switches. Command triggered opening may occur in real time for a shot as needed in response to asymmetry of opening times of the plasma opening switches in the array during the shot.

20 Claims, 19 Drawing Sheets

METHOD AND APPARATUS FOR PULSED POWER GENERATION

RELATED APPLICATIONS

The present application claims the benefit of U.S. Provisional Application Ser. 60/555,937 filed Mar. 24, 2004, incorporated herein by reference. The present application is a continuation-in-part of International Application PCT/US/2005/009723 filed 23 Mar. 2005 and published on 13 Oct. 2005 as WO 2005/094502 and entered in the U.S. national phase as U.S. application Ser. No. 10/599,251 filed 22 Sep. 2006, incorporated herein by reference.

FIELD OF THE INVENTION

The present invention relates to pulsed power generators and pulsed power systems using inductive energy storage and opening switches.

BACKGROUND OF THE INVENTION

Pulsed power has a number of military, industrial, and scientific applications, such as the production of X-rays and nuclear fusion. For most applications, a high-voltage capacitor bank is discharged for pulsed power production. Unfortunately, the energy storage density of a typical high-voltage capacitor is relatively low, especially if the capacitor is rated for repetitive operation.

Due to the limitations of high-voltage capacitor banks, there has been considerable effort toward developing pulsed power generators using stored inductive energy. There are a number of relatively low cost electrical power sources that have a relatively high energy storage density but need inductive energy storage for pulsed power generation. These electrical power sources include homopolar generators, compensated alternators, explosively-driven magnetic flux compressors, and electrolytic capacitors. An opening switch, however, is needed for obtaining pulsed power having a fast current rise from the inductive energy storage.

For example, to power a dense plasma focus with an explosive generator, a useful switch would interrupt a few megaamperes in less than one microsecond and remain open for the 3 to 4 microsecond pulse delivered to the device. (Freeman et al., "Plasma Focus Experiments Powered by Explosive Generators," LA-UR-83-1083, Los Alamos National Laboratories, Los Alamos, 1983, p. 13.)

Efforts toward development of a suitable opening switch are described in G. D. Roy, "High Power, High Repetition Rate Switches: An Overview," *Naval Research Review*, Vol. 2, 1990, p. 17-24. Desired attributes of the switch are fast opening, fast recovery to achieve high repetition rates, controllable and long conduction time, low resistance during conduction, fast rise of impedance during opening, high impedance after opening, large currents, large stand-off voltage, and jitter-free operation. The plasma flow switch is mentioned as having conduction time up to $10^{-5}$ seconds and opening time in the 100 nanosecond time scale, and as of 1990, useful only in very high power (terawatt), low impedance (10 ohm), single shot, staged pulsed power systems. (Page 19.)

For repetitive operation of an inductive store employing homopolar generators, compensated alternators, or electrolytic capacitors, the opening switch should provide a closed state for at least about a millisecond. In this closed state, the voltage across the opening switch should be a small fraction of the voltage of the homopolar generator, compensated alternator, or capacitor bank in the inductive energy storage circuit.

SUMMARY OF THE INVENTION

A first aspect of the present invention is directed to reducing or eliminating a need for command triggered opening of plasma switches in a pulsed power system employing inductive energy storage. In particular it is desired for an array of plasma switches sharing a vacuum chamber to perform most or all of the active switching functions of the pulsed power system. This is desired to enable repetitive operation with sufficient reliability for commercial applications such as nuclear fusion power generation. This is done by one or more of the following techniques: (1) wiring the current sources for first and second currents for respective plasma opening switches in series with all of the plasma opening switches in an array so that that the plasma opening switches close in synchronism, and the opening time of each plasma opening switch is independently adjustable; (2) a data collection system for recording the opening time of each plasma opening switch in the array; (3) a feedback control method of adjusting the plasma switch opening times for a next shot in response to the recorded plasma switch opening times of one or more previous shots; (4) command triggered opening of plasma opening switches in the array in real time for a shot as needed in response to asymmetry of opening times of the plasma opening switches in the array during the shot; or (5) the use of a capacitor pulsed power supply or a magnetic flux compression generator that generates a power pulse at a specified time and produces a difference signal at the beginning of a terminal portion of the power pulse in order to switch the plasma opening switch from the closed state to the open state.

In accordance with one aspect, the invention provides a method of operating an array of plasma opening switches for pulsed power from inductive energy storage. The method includes (a) measuring respective opening times for the plasma opening switches during a first discharge of pulsed power from the inductive energy storage; and then (b) adjusting sources of current to the plasma opening switches in response to the measured opening times for the plasma opening switches; and then (c) obtaining a second discharge of pulsed power from the inductive energy storage.

In accordance with another aspect, the invention provides a pulsed power system including a pulsed power supply; a load connected to the pulsed power supply for receiving power from the pulsed power supply; and a plasma opening switch connected between the pulsed power supply and the load. The pulsed power supply produces a first current and a second current during a power pulse, and the pulsed power supply produces a difference between the first current and the second current during a terminal portion of the power pulse. The plasma opening switch has a closed state in which the plasma opening switch shunts the first current and the second current from the pulsed power supply so that the first current and the second current are not delivered to the load, and the plasma opening switch has an open state in which the plasma opening switch delivers the first current and the second current to the load, and the plasma opening switch switches from the closed state to the open state in response to the difference between the first current and the second current.

BRIEF DESCRIPTION OF THE DRAWINGS

Additional features and advantages of the invention will be described below with reference to the drawings, in which.

Figure 1:
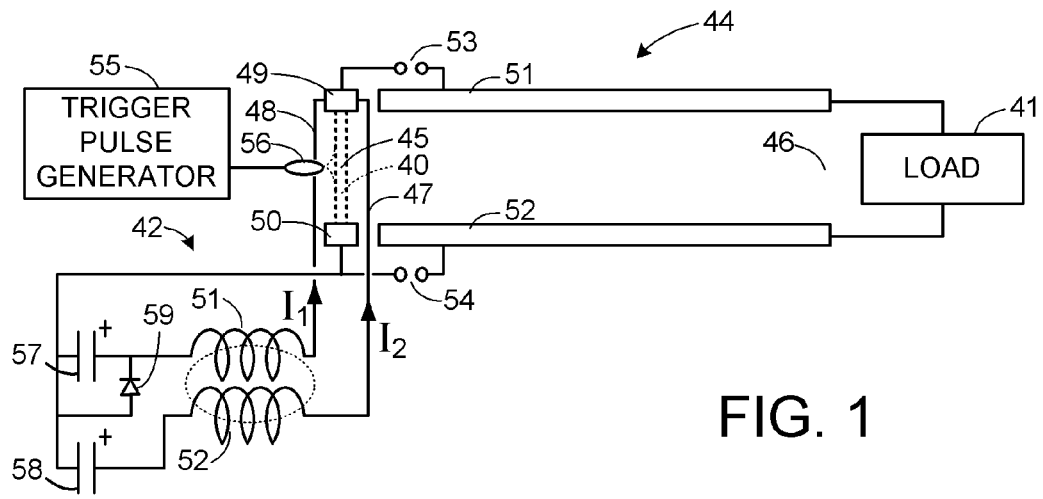
FIG. 1 is a schematic diagram of a pulsed power generator including electrolytic capacitors, an inductive energy store, and a plasma opening switch.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown pulsed power system for supplying pulsed power to a load 41. The pulsed power system includes an inductive energy storage circuit 42 including electrolytic capacitors 57 and 58 and a plasma opening switch 44. The plasma opening switch 44 has a transmission line including spaced conductors 51, 52 coupling the current source 43 to the load 41 for supplying current to the load. The transmission line extends away from a first region 45 toward a second region 46 near the load 41. The plasma opening switch has a closed state, as shown in FIG. 1. In the closed state, a plasma discharge 40 (represented by a pair of dashed lines) is located in the first region 45. The plasma opening switch changes from the closed state to an open state when the plasma discharge 40 is driven by magnetic force from the first region 45 to toward the second region 46.

As further shown in FIG. 1, the pulsed power system includes electrical conductors 47 and 48 arranged for providing a stabilizing magnetic field configuration in the first region 45 to magnetically latch the plasma discharge in the first region during charging of the inductive energy storage circuit 42 with current from the current source 43. However, current flowing along the transmission line conductors 51, 52 from the current source 43 to the load 41 tends to disrupt the stabilizing magnetic field configuration and unlatch the plasma discharge 40 from the first region 45. The first region 45 becomes magnetically insulated when the plasma opening switch is in the open state and conducting current from the current source to the load.

As further shown in FIG. 1, the electrical conductors 47 and 48 are in the inductive energy storage circuit 42 and carry current from the current source 43 to the plasma discharge 40 when the plasma discharge is in the first region 45 and the plasma opening switch is in the closed state. The electrical conductor 48 is in a first current path including an inductor 51 for carrying a first current component tending to magnetically force the plasma discharge 40 toward the second region 46 when the plasma discharge is in the first region 45. The first current is initially supplied by discharge of a first capacitor 57 connected in series with the inductor 51. The electrical conductor 47 is in a second current path including an inductor 52 for carrying a second current component tending to magnetically force the plasma discharge 40 away from the second region 46 when the plasma discharge is in the first region 45. The second current is initially supplied by discharge of a second capacitor 58 in series with the inductor 52. The first and second capacitors 57, 58, for example, are electrolytic capacitors (for a lifetime of up to about 10,000 shots) or metalized polypropylene film capacitors (for a lifetime in excess of 10,000,000 shots).

As further shown in FIG. 1, the pulsed power system includes a trigger pulse generator 55 for applying a pulse to a trigger electrode 56 for initiating the plasma discharge 40. After one-quarter of a discharge cycle, a crowbar diode 59 across the first capacitor 59 becomes forward biased. Because the second capacitor 58 does not have a crowbar diode, mutual inductance between the inductor 51 and the inductor 52 causes the first current (I1) to rapidly increase and the second current (I2) to rapidly decrease once the crowbar diode 59 becomes forward biased. This rapid increase in the first current (I1) and decrease in the second current (I2) destabilizes the stabilizing magnetic field configuration and thereby switches the plasma opening switch from the closed state to the open state. This decrease in current (I2) through the conductor 47 and increase in current (I1) through the conductor 48 forces the plasma discharge 40 toward the load 41.

Consequently, the direct path between the electrodes 49 and 50 becomes magnetically insulated, producing a substantial voltage across the electrodes 49 and 50. The substantial voltage across the electrodes 49 and 50 causes isolation devices 53 and 54 to conduct current. The isolation device 53 connects the electrode 49 to the transmission line conductor 51, and the isolation device 54 connects the electrode 50 to the transmission line conductor 52.

The isolation devices 53 and 54, for example, are spark gaps, metal oxide varistors, or silicon carbide varistors, which have a high incremental resistance for a low applied voltage, and a low incremental resistance for a high applied voltage. The threshold voltage for conduction of the spark gaps or varistors, for example, is slightly greater than the voltage required for sustaining the plasma discharge across the spaced electrodes 49, 50 in the first region when the plasma switch is in the closed state. The isolation devices 53 and 54 could also be semiconductor diodes, thyristors, or other kinds of switching devices. In general, the isolation devices have a relatively high resistance when the plasma discharge is in the first region 45 and the plasma opening switch 44 is in a closed state, and the isolation devices have a relatively low resistance when the plasma opening switch is in an open state. Once the isolation devices become conductive, the plasma discharge 40 conducts current between the transmission line conductors 51 and 52, and magnetic force drives the plasma discharge 40 toward the load 41.

Further details of the plasma opening switch 44 are disclosed in International Application No. PCT/US/2005/009723 filed 23 Mar. 2005 and published on 13 Oct. 2005 as WO 2005/094502 and published on 2 Oct. 2008 as U.S. Patent Application Pub. 20080237449, all of which are incorporated herein by reference.

Figure 2:
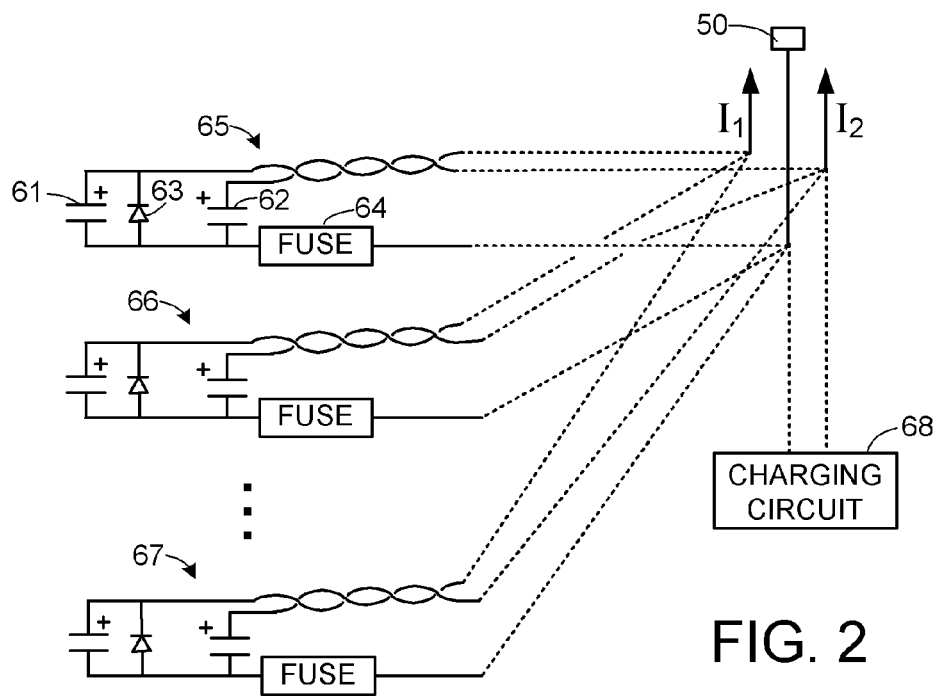
FIG. 2 is a schematic diagram of a capacitor bank and a charging circuit for charging the capacitor bank.

As shown in FIG. 2, each of the capacitors 57 and 58 of FIG. 1, crowbar diode 59 of FIG. 1, are comprised of respective capacitors and diodes of capacitor bank modules 65, 66, and 67, and the inductors 51 and 51 are comprised of wires connecting the capacitor bank modules to the opening switch including the cathode 50. Each of the capacitor bank modules 65, 66, and 67 also includes a fuse 64. For example, the capacitor bank module 65 includes a capacitor 61 which provides part of the capacitance 57 in FIG. 1, a capacitor 62 which provides part of the capacitance 58 in FIG. 1, a diode 63 which provides part of the diode 59 in FIG. 1, and a fuse 64.

In general, a multiplicity of capacitor bank modules are wired in parallel to form a capacitor bank, and the capacitor bank provides the first and second currents (I1 and I2) for control of a particular plasma opening switch. A multiplicity of capacitor banks and a multiplicity of plasma opening switches are connected together in an array to supply pulsed power to a common load. As further shown and described below with reference to FIGS. 9 and 10, the capacitor banks of the array are wired in series with the anodes and cathodes of the opening switches in the array, so that the discharge of all of the capacitor banks will begin at the same time, and the sum of the first and second currents (I1+I2) will be the same for each bank at least prior to the opening of the plasma opening switches in the array. In this case, the time at which the crowbar diodes for each bank become forward biased (causing I1 and I2 to rapidly diverge to open the respective plasma opening switch controlled by the bank) is proportional to the initial voltage across the capacitors in each bank. Therefore, as further shown and described below with reference to FIG. 22, the capacitor banks can be charged to respective initial voltages selected to obtain near simultaneous opening of the plasma opening switches in the array.

Figure 3:
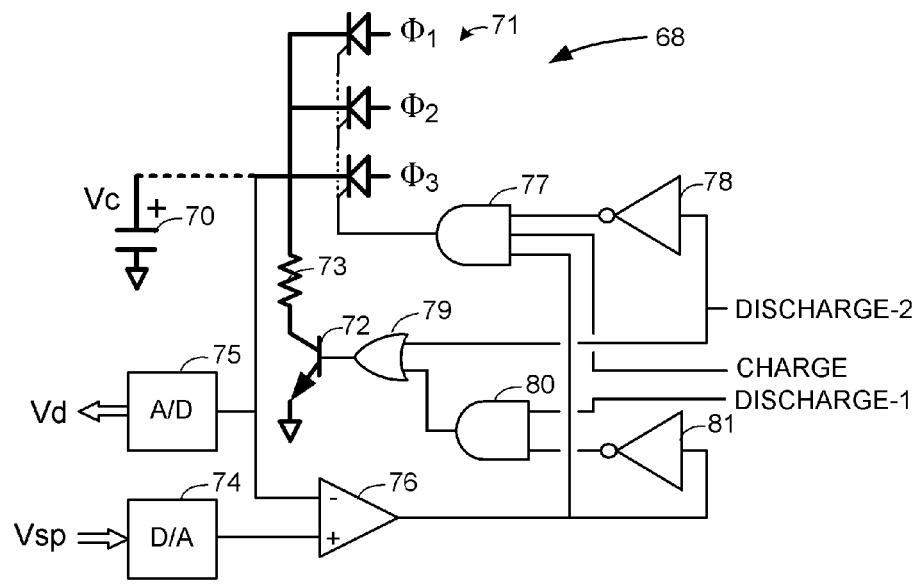
FIG. 3 is a schematic diagram of the charging circuit introduced in FIG. 2.

FIG. 3 shows a respective charging circuit 68 for a capacitor bank depicted by a capacitor 70. The charging circuit includes silicon controlled rectifiers 71 for three-phase AC power ($\Phi_1$, $\Phi_2$, $\Phi_3$), a transistor for discharge of the capacitor bank through a bleeder resistor 72, a digital-to-analog converter 74 responsive to a digital voltage set-point (sp) an analog-to-digital converter 75 providing a digital measurement (Vd) of the capacitor bank voltage, an analog voltage comparator 76, and logic gates 77, 78, 79, and 80 for charging the capacitor bank up to at least the set point voltage (in response to the Charge control signal), discharging the capacitor bank to the set point voltage (in response to the Discharge-1 control signal), or discharging the capacitor bank voltage to zero (in response to the Discharge-2 control signal).

Figure 4:
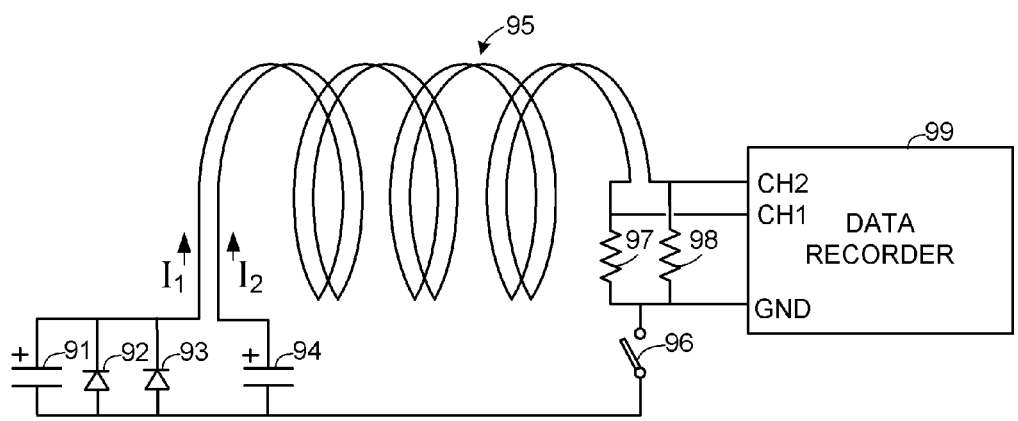
FIG. 4 is a schematic diagram of a test circuit producing the results shown in FIGS. 5 to 8.

FIG. 4 shows a test circuit which generated the waveforms shown in FIGS. 5-8. This test circuit included two 3,900 uF, 400 volt electrolytic capacitors 91, 94; two 75 amp, 600 volt silicon rectifier diodes 92, 93; about 38 feet of four-conductor copper household wring cable 95 in a thirteen-turn coil; current sensing resistors 97, 98 of about 0.01 ohm each consisting of about 1 inch of steel wire, a dual-channel 100 MHz sampling rate digital oscilloscope data recorder 99, and a mechanical switch 96.

Figure 5:
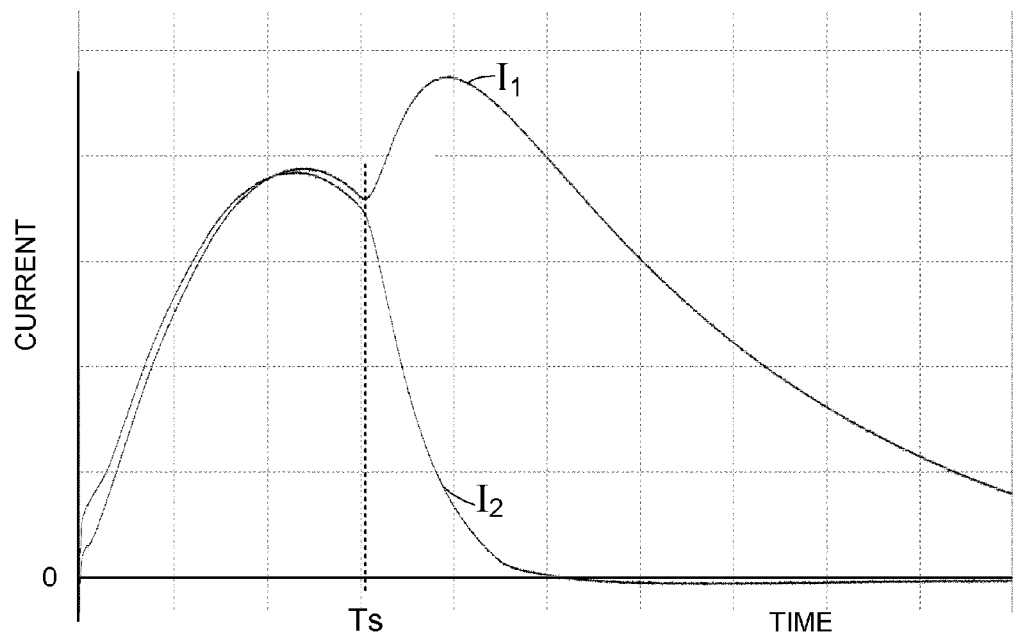
FIG. 5 is a graph of discharge current as a function of time in the circuit of FIG. 4.
Figure 6:
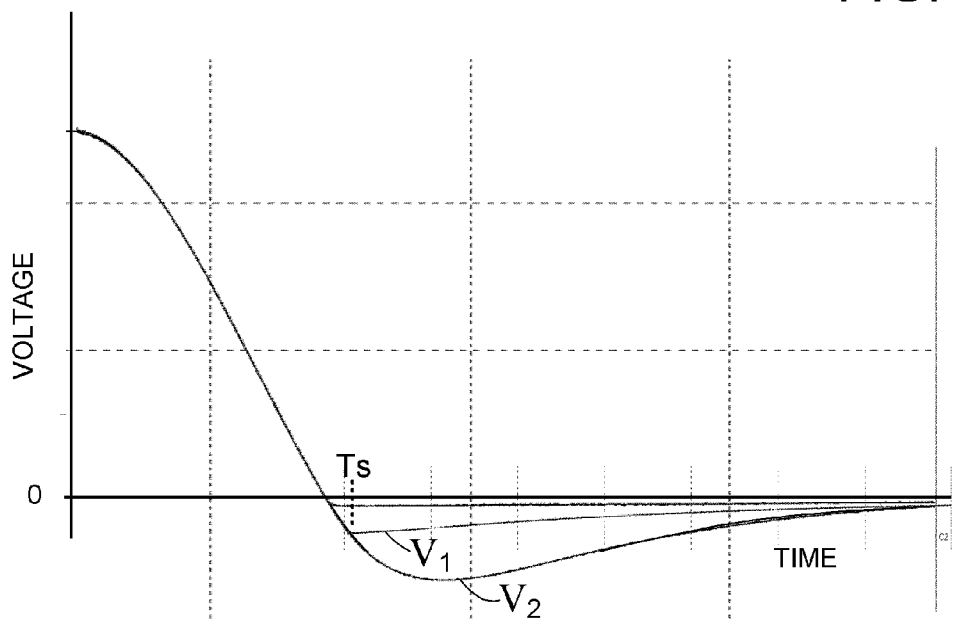
FIG. 6 is a graph of capacitor voltage as a function of time in the circuit of FIG. 4.
Figure 7:
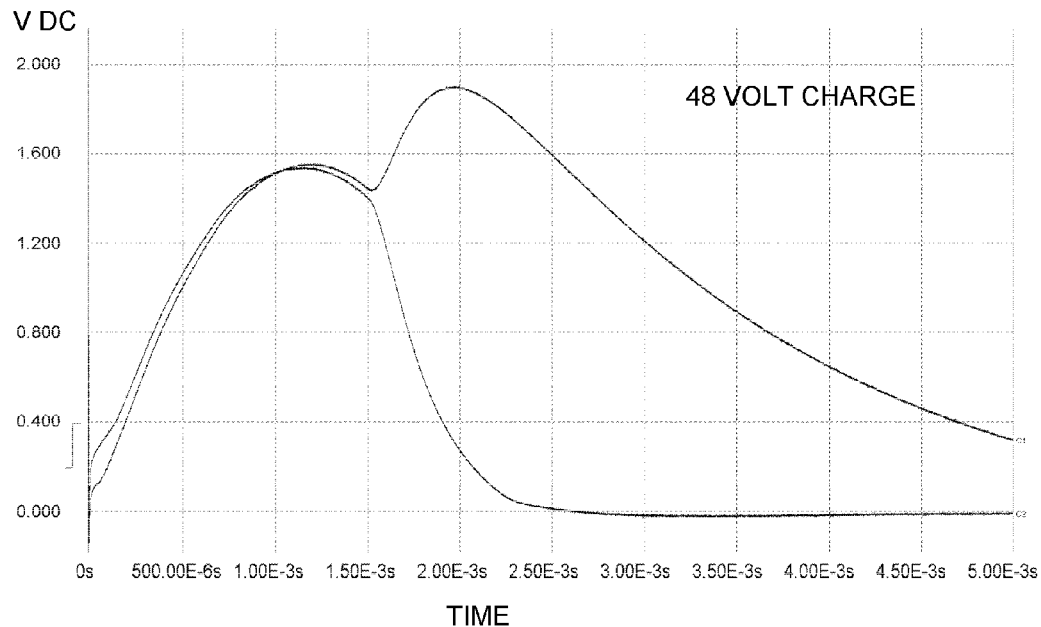
FIG. 7 is a graph of voltage as a function of time recorded by the data recorder in the circuit of FIG. 4 for an initial capacitor voltage of 48 volts.
Figure 8:
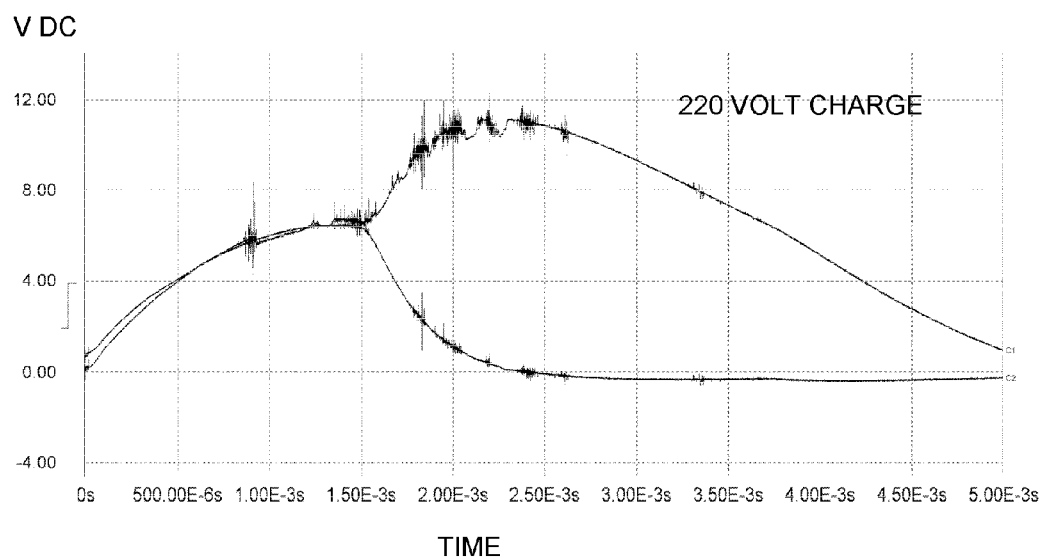
FIG. 8 is a graph of voltage as a function of time recorded by the data recorder in the circuit of FIG. 4 for an initial capacitor voltage of 220 volts.

FIGS. 5 and 7 show the I1 and I2 current waveforms measured as respective voltages across the current sensing resistors in FIG. 4 after initially charging the capacitors 91, 93 to 48 volts. FIG. 6 shows the respective voltages V1 and V2 across the capacitors 91, 92 as a function of time after closure of the switch 96 to the same time scale as shown in FIG. 5 and FIG. 7. FIG. 8 shows the respective voltages across the current sensing resistors following switch closure after the capacitors were initially charged to 220 volts. The noise in the waveforms of FIG. 8 apparently was due to arcing of the switch contacts.

Figure 9:
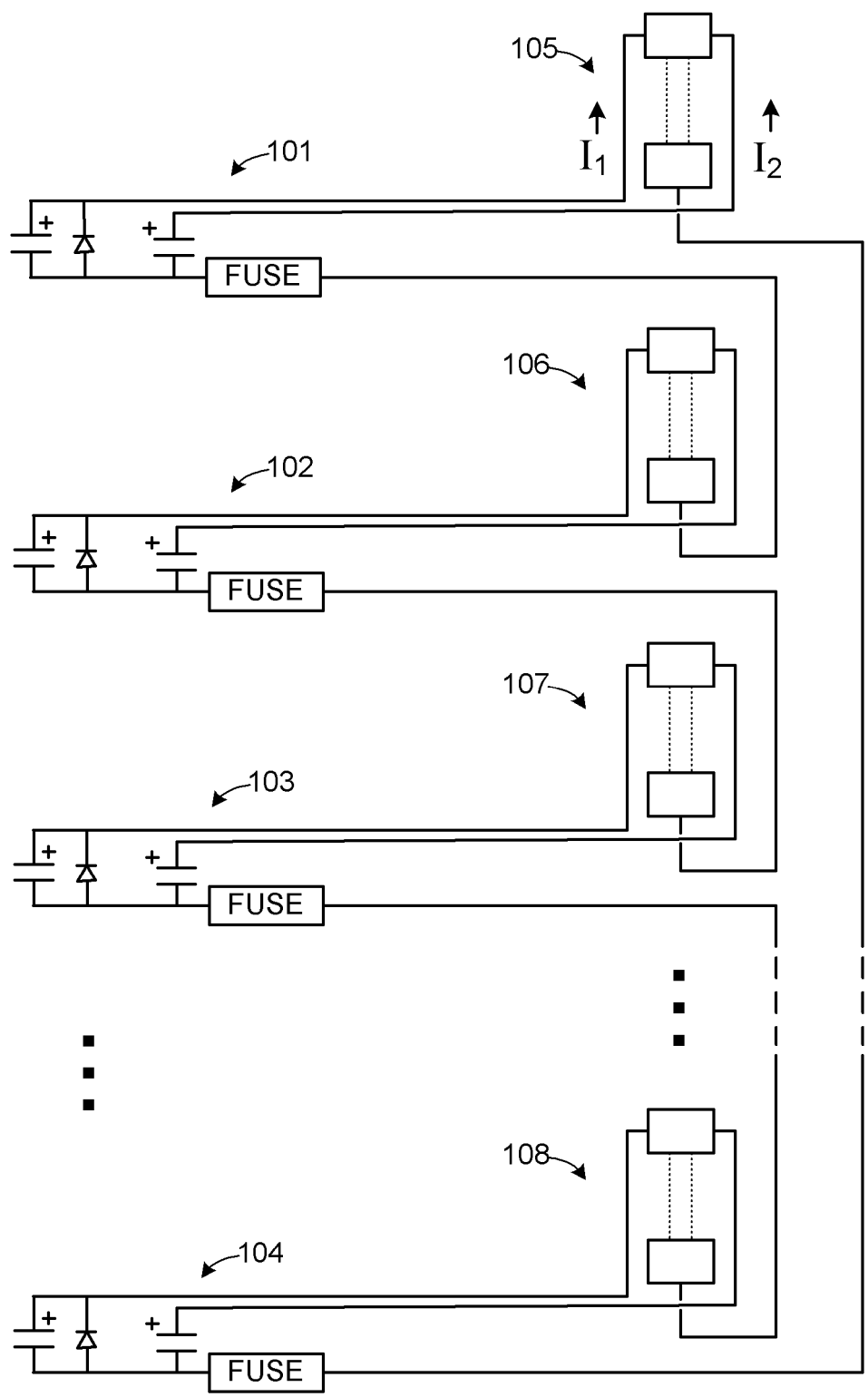
FIG. 9 is a schematic diagram showing capacitor banks and plasma opening switches connected in series in order to synchronize switch closing time and equalize the discharge current through the switches.

FIG. 9 shows that the capacitor banks 101, 102, 103, 104 are all wired in series with the plasma opening switches 105, 106, 107, 108 for simultaneous closing of the plasma opening switches and to ensure that the discharge current is substantially the same through the plasma opening switches until the plasma opening switches begin to open. In this example, each plasma opening switch is associated with a respective one and only one of the plasma opening switches that supplies the respective plasma opening switch with the first and second currents I1 and I2, so that the initial voltage across the capacitor bank at the beginning of the discharge controls the opening time of the respective plasma opening switch.

Figure 10:
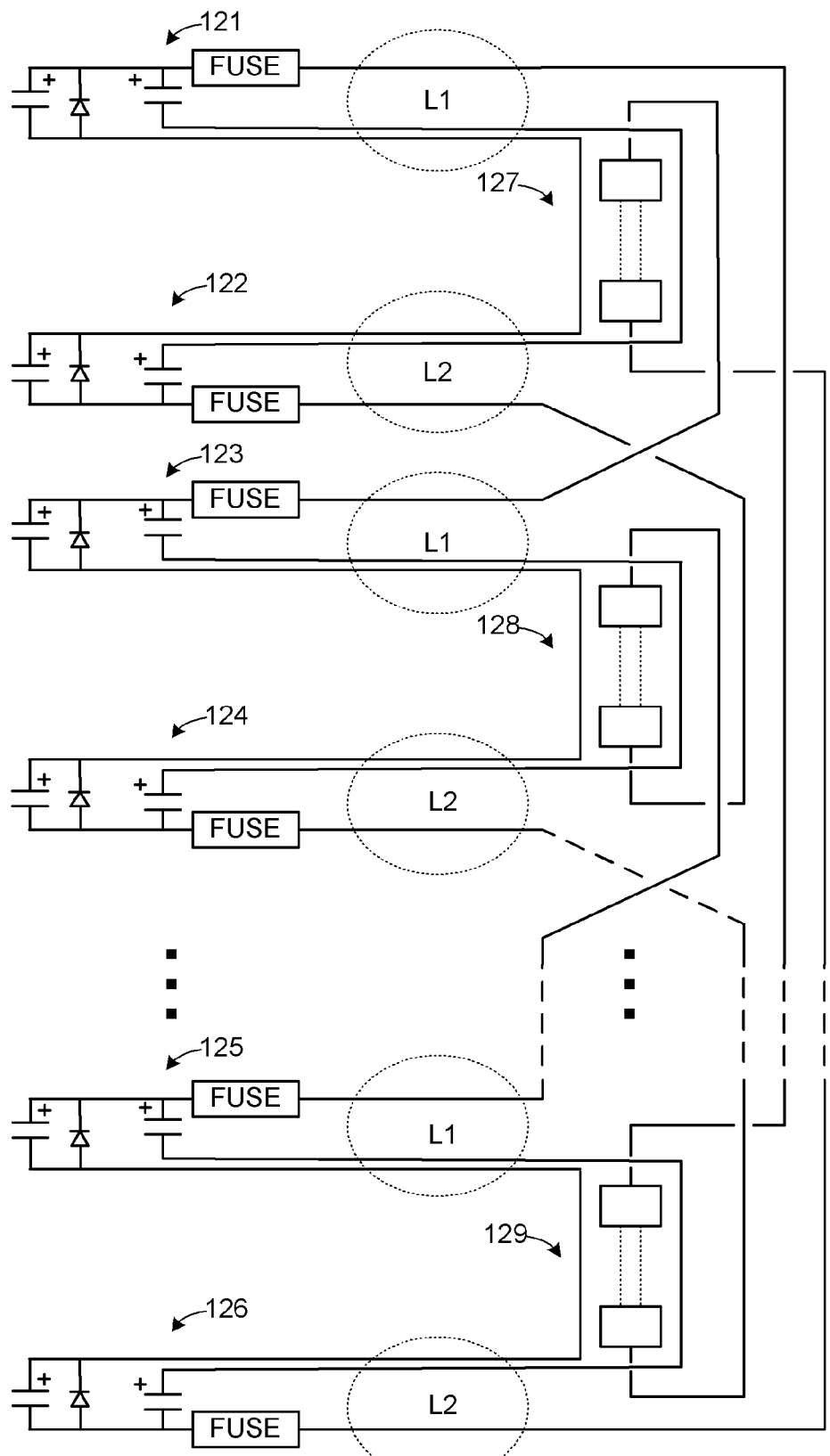
FIG. 10 is a schematic diagram showing capacitor banks and plasma opening switches connected in series in which two capacitor banks are provided for each switch.

FIG. 10 shows an example where each plasma opening switch 127, 128, 129 is associated with a respective pair of capacitor banks (121, 122), (123, 124), (125, 126) that supply the respective plasma opening switches with the first and second currents I1 and I2, so that the initial voltage across the capacitor banks in the pair at the beginning of the discharge controls the opening time of the respective plasma opening switch. In FIG. 10, the wires coupling the capacitor banks to the plasma opening switches in combination can provide an upper electromagnet coil L1 and a lower electromagnet coil L2 for magnetizing the common transmission line of the opening switch array in a spheromak device.

Figure 11:
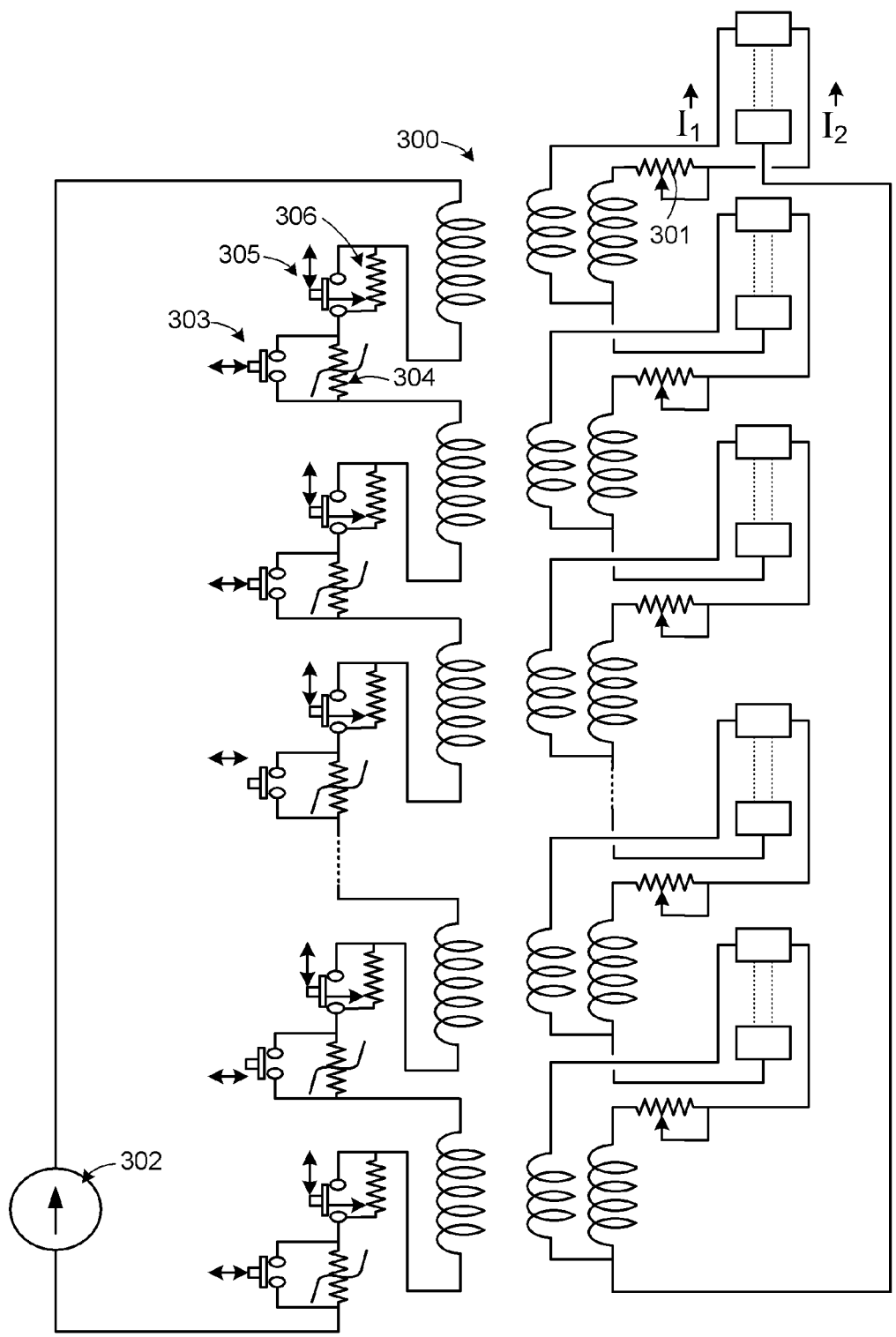
FIG. 11 is a schematic diagram showing a generator coupled to the plasma opening switches in the array via an inductive energy storage transformer having a pair of secondary windings for providing a respective first and second current to each plasma switch.

FIG. 11 shows an alternative arrangement in which the inductive store for supplying the current to the opening switch array is a toroidal transformer 300 providing a respective pair of secondary windings for supplying the first and second currents I1, I2 to each plasma opening switches. The secondaries and the plasma opening switches are all wired together in series for simultaneous closing of the plasma opening switches and to ensure that the discharge current is substantially the same through the plasma opening switches until the plasma opening switches begin to open. A variable resistor (e.g., 301) in the second current (I2) path to each plasma opening switch is adjustable to adjust the opening time of the plasma opening switch. The primary of the toroidal transformer 300 is excited by a pulse of current from a homopolar generator 302. Once the toroidal transformer is charged by current from the homopolar generator 300, a multiplicity of high-current low-voltage mechanical opening switches (e.g., 303) are opened to transfer current from the primary windings to the secondary windings of the transformer 300. A respective silicon carbide varistor (e.g., 304) shunts each high-current low-voltage mechanical opening switch. Once the primary current is substantially diverted to the secondary windings, a multiplicity of low-current high-voltage mechanical opening switches (e.g., 305) open the primary circuit prior to the opening of the plasma opening switches. Each of the low-current high-voltage mechanical opening switches has an integrated variable snub resistor (e.g., 306) for preventing arcing in the low-current high-voltage mechanical opening switch.

Figure 12:
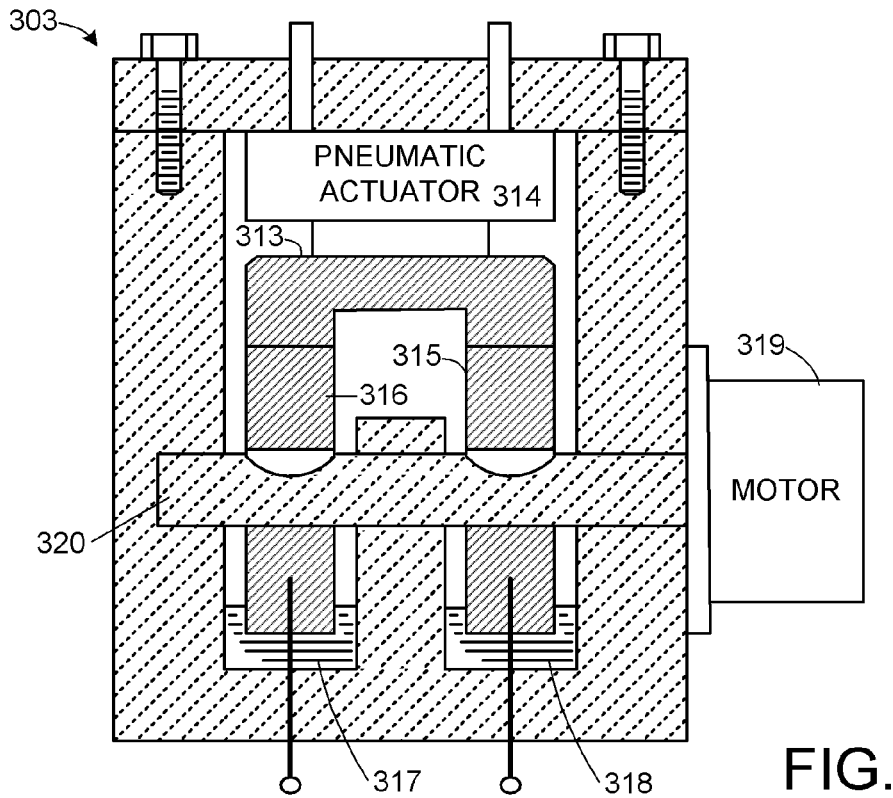
FIG. 12 is a schematic diagram of a high current low voltage repetitive mechanical opening switch using contacts coated with liquid metal picked up by discs rotated by a motor.

FIG. 12 shows that the high-current, low-voltage opening switch 303 has a contactor armature 313 driven by a pneumatic actuator into a set of disks 315, 316 that pick up liquid metal 317, 318 (such as mercury, Woods metal, or sodium-potassium alloy) when a motor 319 rotates a shaft 320. The switch 303 is filled with a pressurized gas such as helium, argon, or nitrogen.

Figure 13:
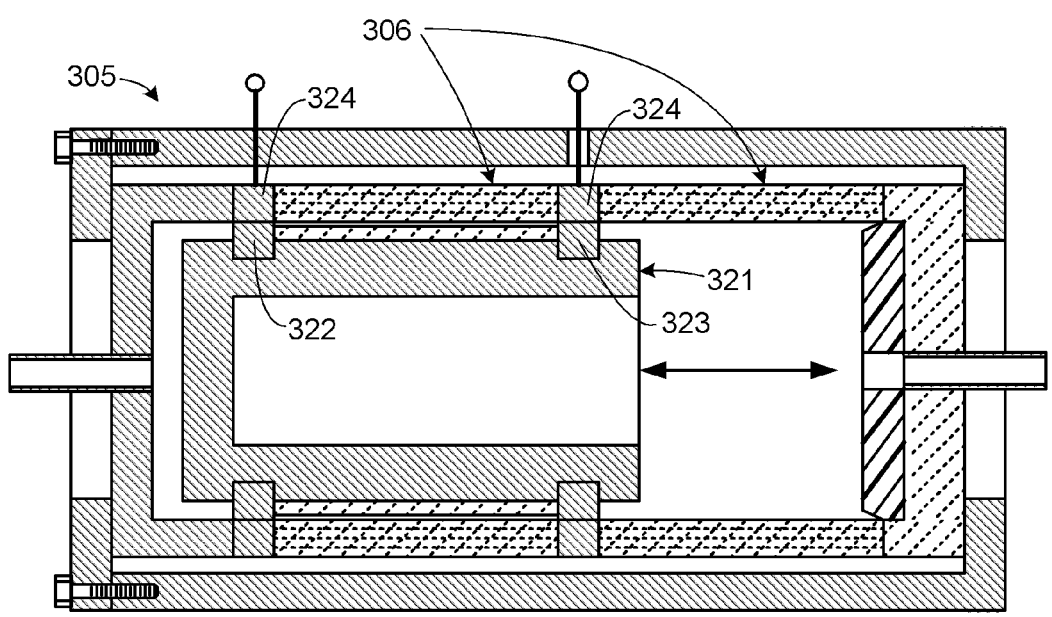
FIG. 13 is a schematic diagram of a low current high voltage repetitive mechanical opening switch having sliding contact brushes in a pneumatic piston that provide a variable resistance upon opening via contact with an integrated cylindrical snub resistor of a pneumatic cylinder wall.

FIG. 13 shows that the low-current, high-voltage opening switch 305 has a pneumatic piston 321 carrying brushes 322, 323 contacting terminal rings 324, 325 when the switch is closed, and otherwise providing a variable-resistance path through the snub resistor 306.

Figure 14:
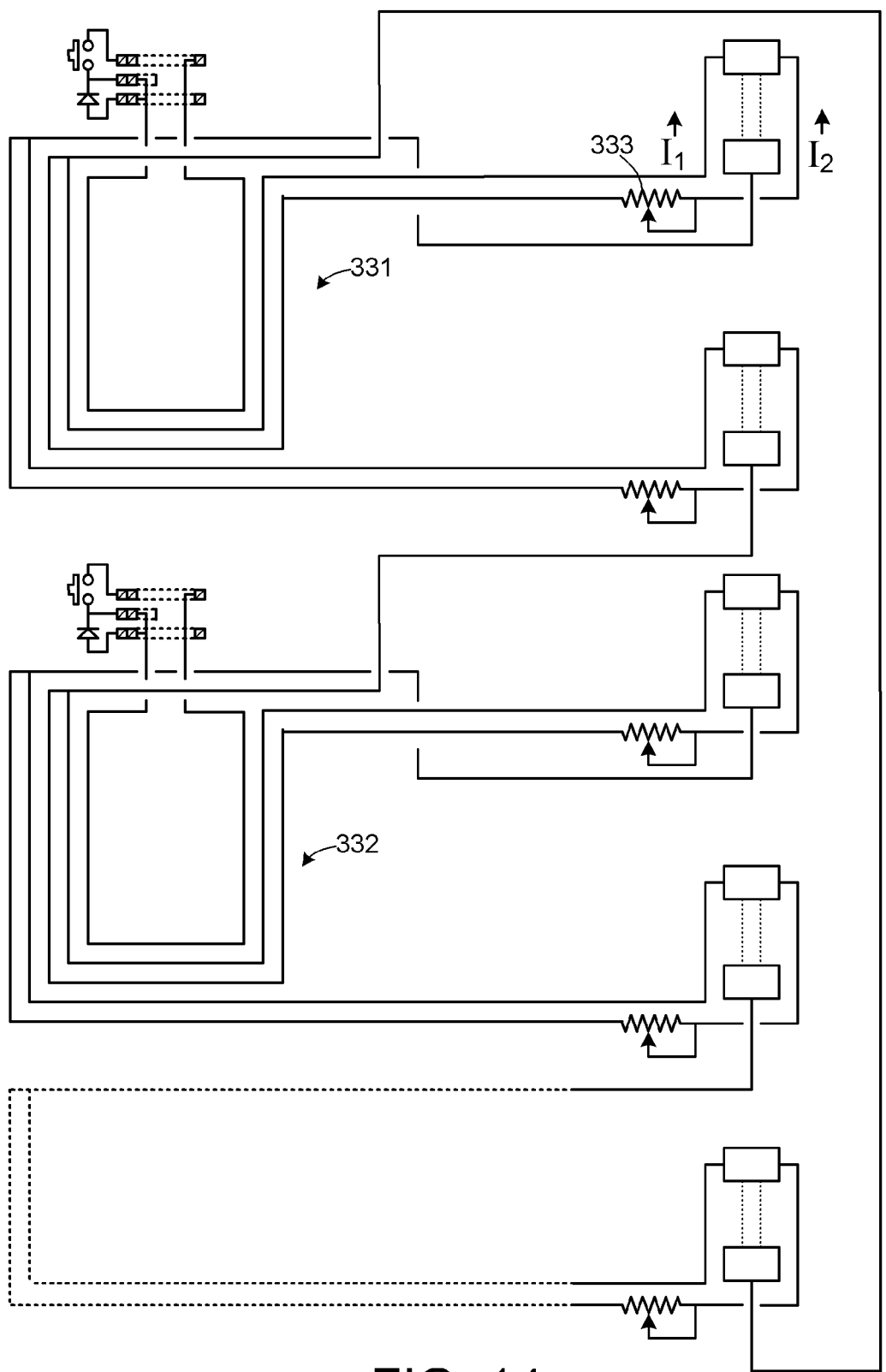
FIG. 14 is a schematic diagram showing how the plasma opening switches can be wired in series to a respective set of compulsator windings for each plasma opening switch.

FIG. 14 shows another alternative arrangement in which the plasma opening switches are wired together in series with respective windings of compulsators 331, 332 for simultaneous closing of the plasma opening switches and to ensure that the discharge current is substantially the same through the plasma opening switches until the plasma opening switches begin to open. A variable resistor (e.g., 333) in the second current (I2) path to each plasma opening switch is adjustable to adjust the opening time of the plasma opening switch.

Figure 15:
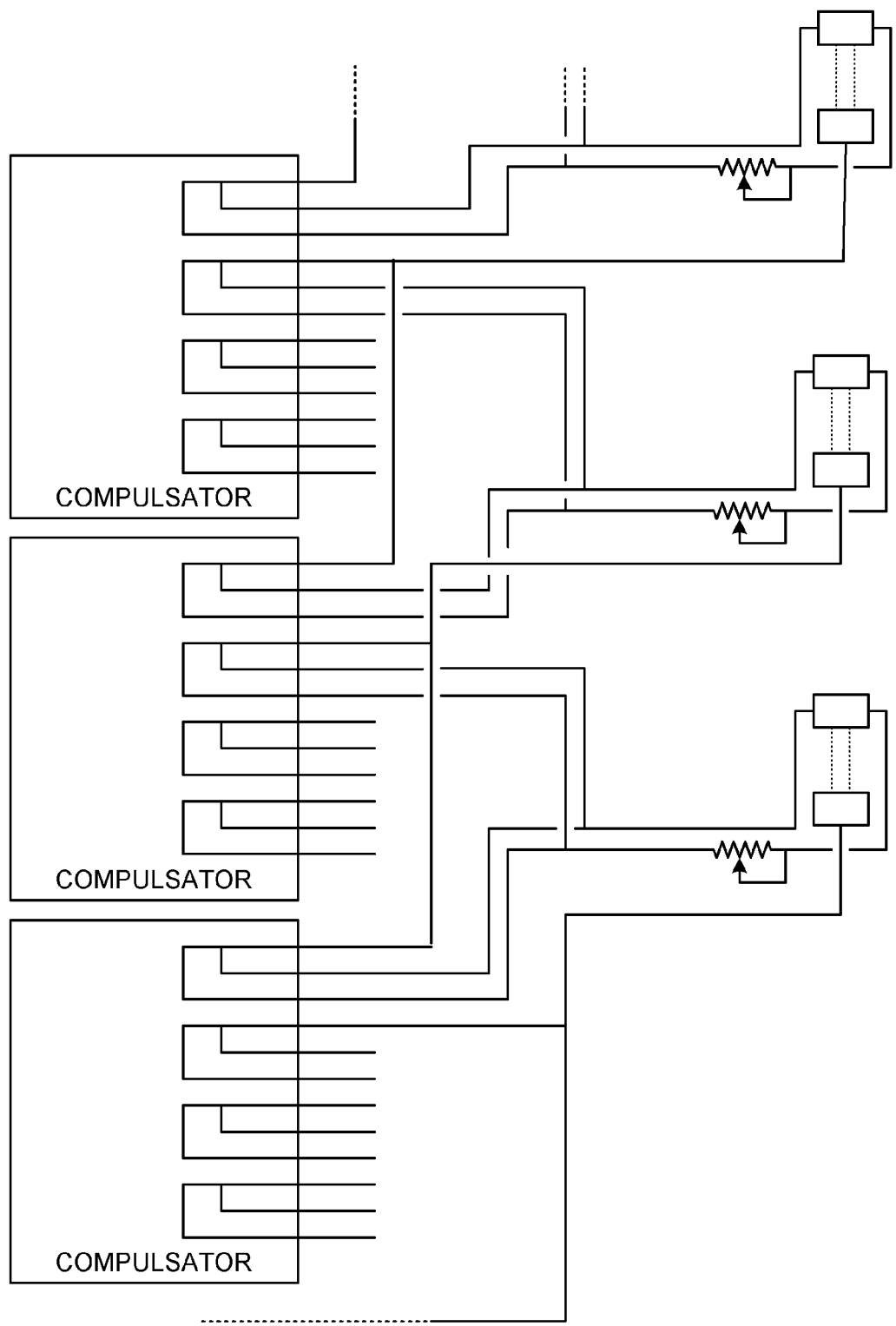
FIG. 15 is similar to FIG. 14 but further shows that a respective compulsator winding for each plasma opening switch is provided in more than one compulsator (or in each compulsator) and the respective windings for each plasma opening switch in the more than one compulsator are wired in parallel between the compulsators so as to reduce or eliminate variation in rotor phase between the generators from causing a variation in opening time between plasma opening switches in the array.

FIG. 15 is similar to FIG. 14 but further shows that a respective compulsator winding for each plasma opening switch is provided in more than one compulsator (or in each compulsator) and the respective windings for each plasma opening switch in the more than one compulsator are wired in parallel between the compulsators so as to reduce or eliminate variation in rotor phase between the generators from causing a variation in opening time between plasma opening switches in the array.

Figure 16:
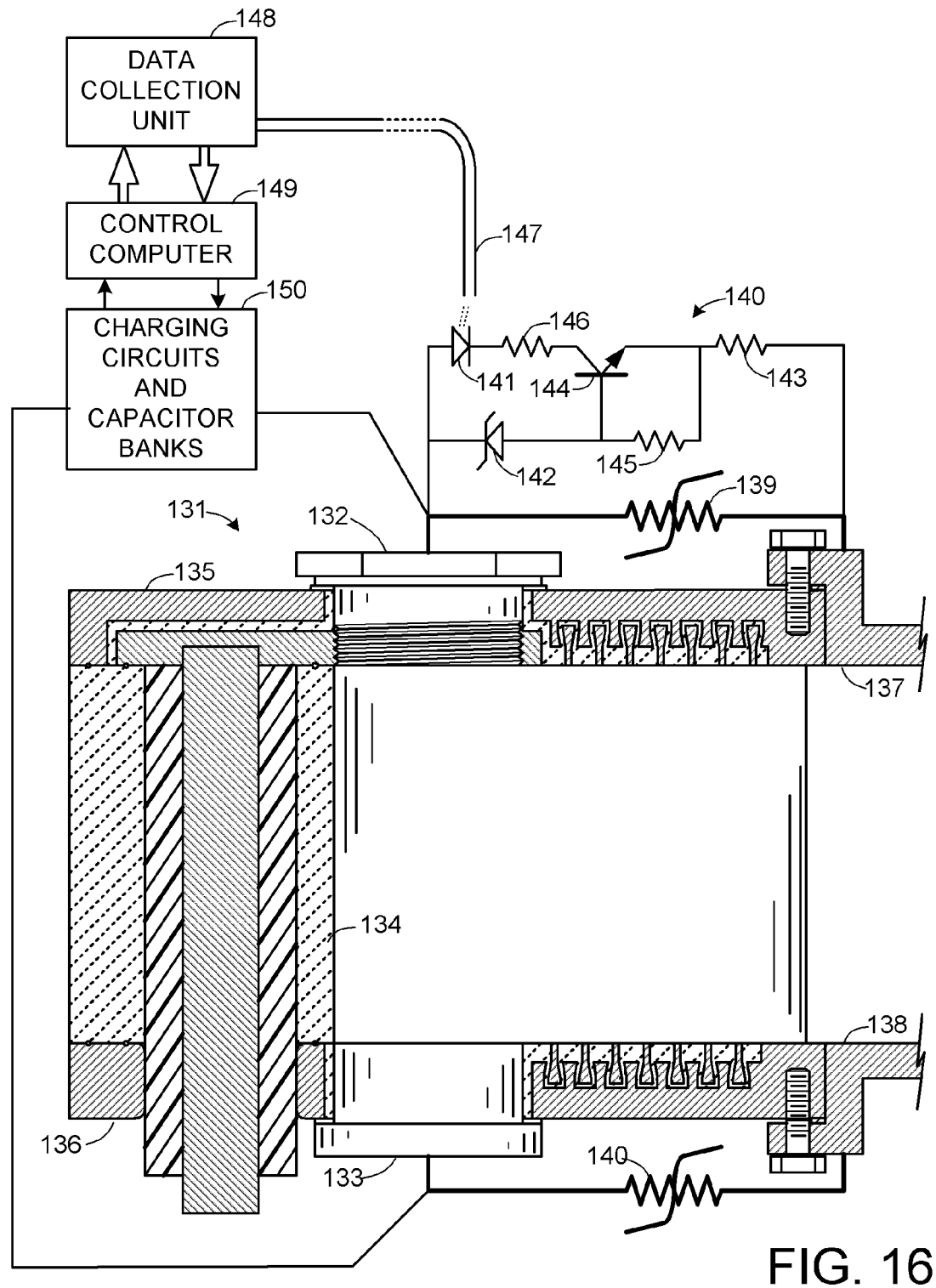
FIG. 16 is a schematic diagram showing a circuit for detecting the opening time of one of the plasma opening switches in an array of plasma opening switches.

FIG. 16 shows a circuit for measuring the opening time of each plasma opening switch 131 in an array of plasma opening switches. The plasma opening switch 131 has an anode 132 and a cathode 133 separated by an insulator 134 in common with the other plasma opening switches in the array. The insulator 134 is clamped between two metal rings 135, 136 bolted to the common transmission line conductor plates 137, 138. The anode 132 is coupled via a silicon carbide varistor 139 to the conductor plate 137, and the cathode is coupled via a silicon carbide varistor 140 to the conductor plate 140.

In order to sense the opening time of the plasma opening switch 131, a light-emitting diode (LED) 141 is energized when the voltage across the varistor 139 exceeds a threshold voltage set by a zener diode 142 and a transistor 144. A resistor 146 limits the current to the LED 141, and resistor 143 and 145 limit the current to the transistor 144 and the zener diode 142. A fiber optic line 147 conveys the light signal from the LED 141 to a data collection unit 148 coupled to a computer 149 which controls the charging circuits and capacitor banks 150.

Figure 17:
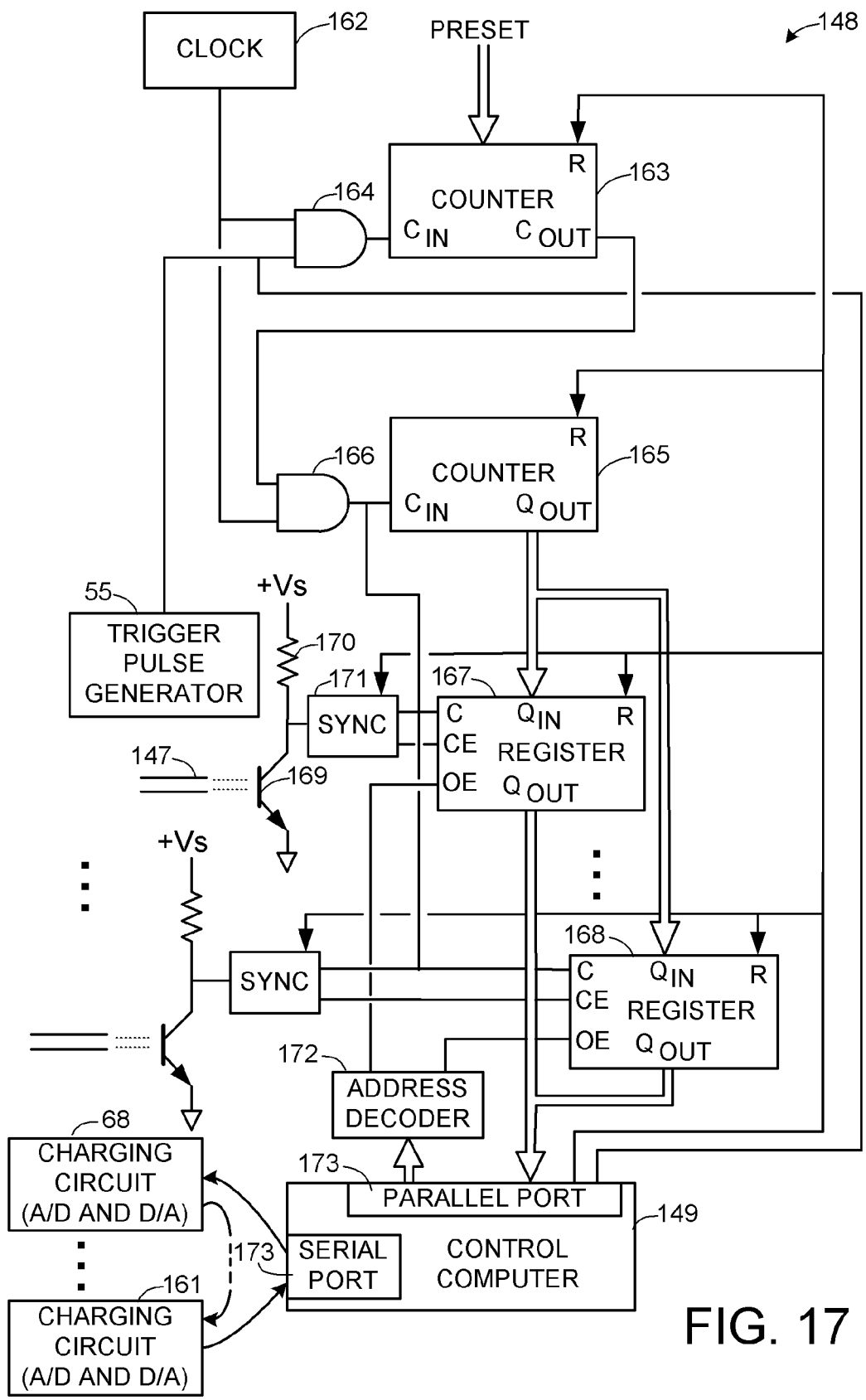
FIG. 17 is a schematic diagram showing details of a data collection unit introduced in FIG. 16.

FIG. 17 shows details of the data collection unit 148. A clock 162 drives a counters 163 to count a predetermined amount of time since a trigger pulse generator 55 initiates closing of the plasma opening switches in the array. Then the carry out of the counter 163 enables an AND gate 166 so that a counter 165 begins counting over an interval over which the plasma opening switches will open. Each plasma opening switch has a respective register 167, 168 for latching the respective opening time from the counter 165. For example, the light pulse from the fiber optic line 147 causes a phototransistor 169 to close and pull down a signal from a load resistor 170. This signal is synchronized by the circuit 171 to the gated clock signal from the AND gate 166 to produce a single pulse enabling the register 167 to latch the output of the counter 165.

At the end of a shot, the control computer 149 sends an address signal out a parallel port 173 to an address decoder in order to address each register 167, 168 to read the opening time for each plasma opening switch in the array. The charging circuits 68, 161 are coupled to the control computer 149 vial a serial port 173, for example, via fiber optic data lines. The control computer can then adjust the charging circuits to reduce variation in the opening times of the plasma opening switches in order to achieve near simultaneous opening of the plasma opening switches. In the alternative embodiments using a toroidal transformer inductive store or compulsators instead of capacitor banks, the serial port would be interfaced to stepper motors to adjust the respective variable resistor controlling the second current (I2) for each plasma opening switch. Then the control computer 149 resets the counters and registers in anticipation of the next shot.

Figure 18:
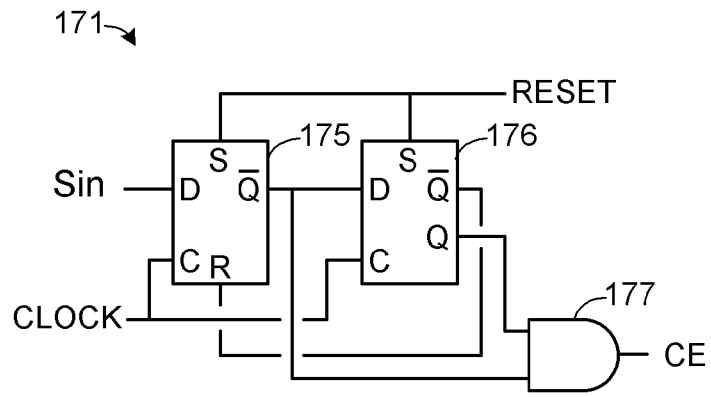
FIG. 18 is a schematic diagram of synchronization circuit used in the data collection unit of FIG. 17.

FIG. 18 shows details of the sync circuit (171 in FIG. 17). The sync circuit includes two D flip-flops 175, 176 for synchronizing the input signal (Sin) to the clock. An AND gate 177 outputs a single pulse when the first high-to-low transition is detected in the analog input signal Sin.

Figure 19:
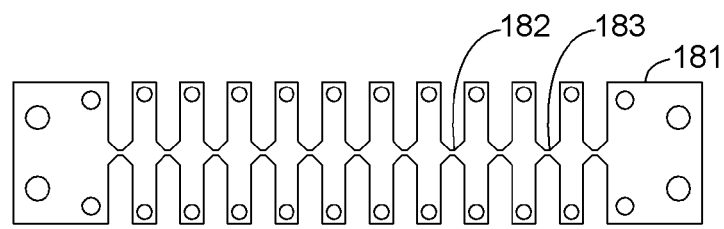
FIG. 19 is a plan view of a metal strip for a fuse.
Figure 20:
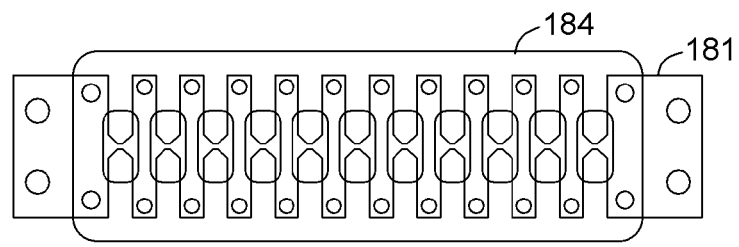
FIG. 20 is a plan view of the fuse using the metal strip of FIG. 17.
Figure 21:
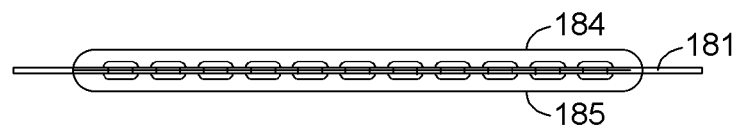
FIG. 21 is a side view of the fuse of FIG. 18.

FIG. 19 shows a high current fuse strip 181 of conductive metal and formed with a multiplicity of fuse elements 182, 182. As shown in FIGS. 20 and 21, a fuse further includes a top plastic insulator 184 and a bottom plastic insulator 185 forming a respective cavity for each of the fuse elements 182, 183.

Figure 22:
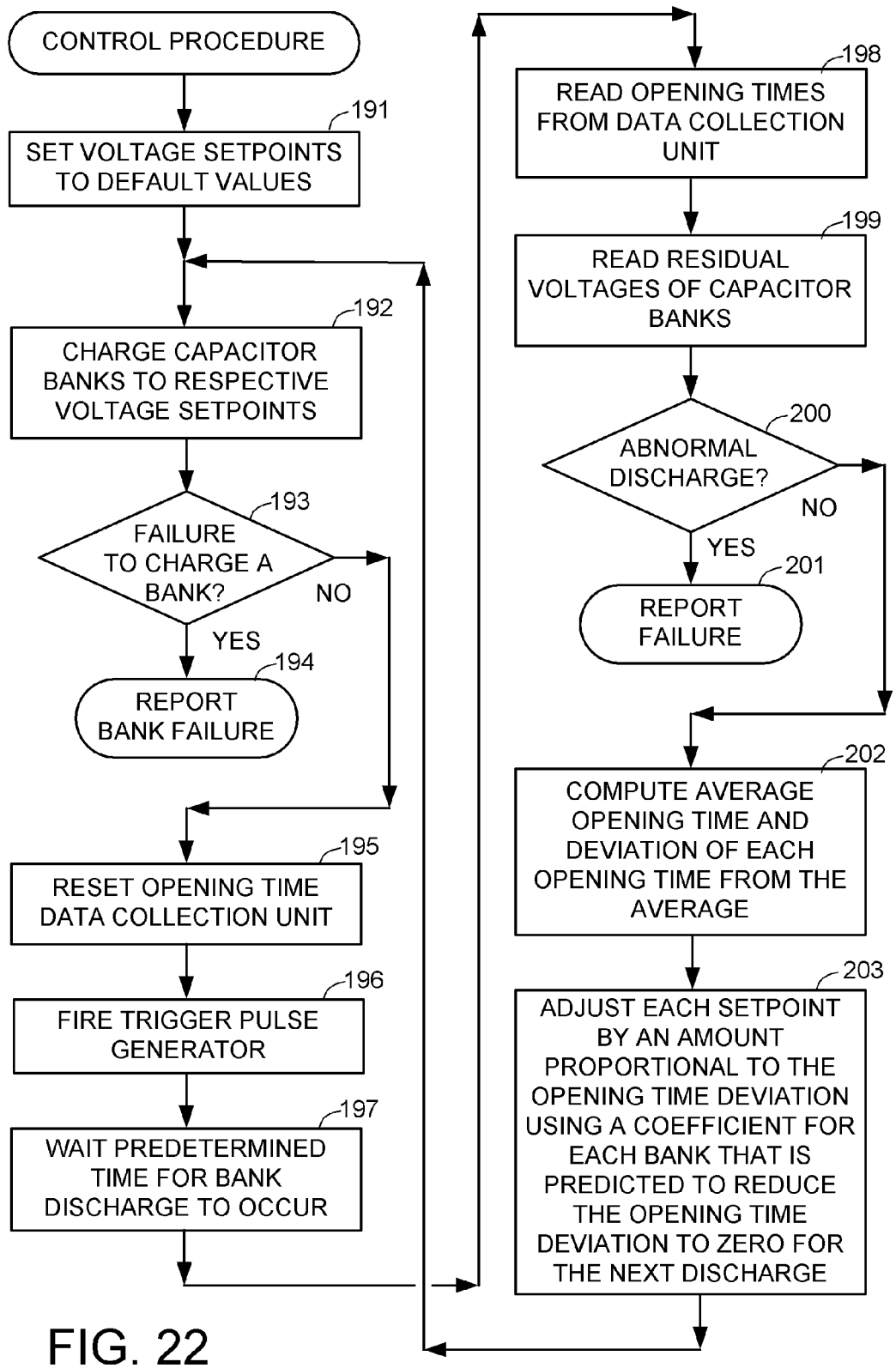
FIG. 22 is a flowchart of a control procedure for adjusting the capacitor bank charging voltages in order to obtain near simultaneous opening of the plasma opening switches.

FIG. 22 shows a control procedure for adjustment of the opening time of the plasma opening switches to achieve near simultaneous opening of the plasma opening switches, for the case where each opening switch is provided with first and second currents from a respective one or two capacitor banks. In a first step 191, the capacitor bank voltage set points are set to initial default values. Then in step 192, the capacitor banks are charged to their respective voltage set points. In step 193, if there is failure to charge a bank to its set point voltage, then the shot is scrubbed and a bank failure is reported. If not, the procedure continues to step 195. In step 195, the control computer resets the opening time data collection unit. Then in step 196, the control computer fires the trigger pulse generator. Then in step 197, the control computer waits a predetermined time for bank discharge to occur and for opening of the plasma opening switch array. In step 198, the control computer reads the opening times from the data collection unit. In step 199, the control computer reads the residual voltages of the capacitor banks to detect an abnormal discharge. If there is an abnormal discharge, then execution branches from step 200 to step 201 to report a failure. Otherwise, the procedure continues to step 202 to compute the average opening time and deviation of each opening time from the average. In step 203, the control computer adjusts each capacitor bank voltage set point by an amount proportional to the opening time deviation using a coefficient for each bank that is predicted to reduce the opening time deviation to zero for the next discharge. Execution loops back from step 203 to step 192 to continue to the next shot.

If the plasma switch currents are supplied by a homopolar generator or compulsator instead of capacitor banks, then the control procedure is similar to that shown in FIG. 22 except steps 191-194 and 198-201 are omitted. Instead of firing a trigger pulse generator in step 196, the switches to the primary of the toroidal transformer are opened, or switches to the compulsator rotors are closed to initiate the flow of current to the plasma opening switches. Also, in step 203, instead of adjusting capacitor set point voltages, the variable resistor for each plasma opening switch is adjusted to adjust the opening time for the plasma opening switch.

Figure 23:
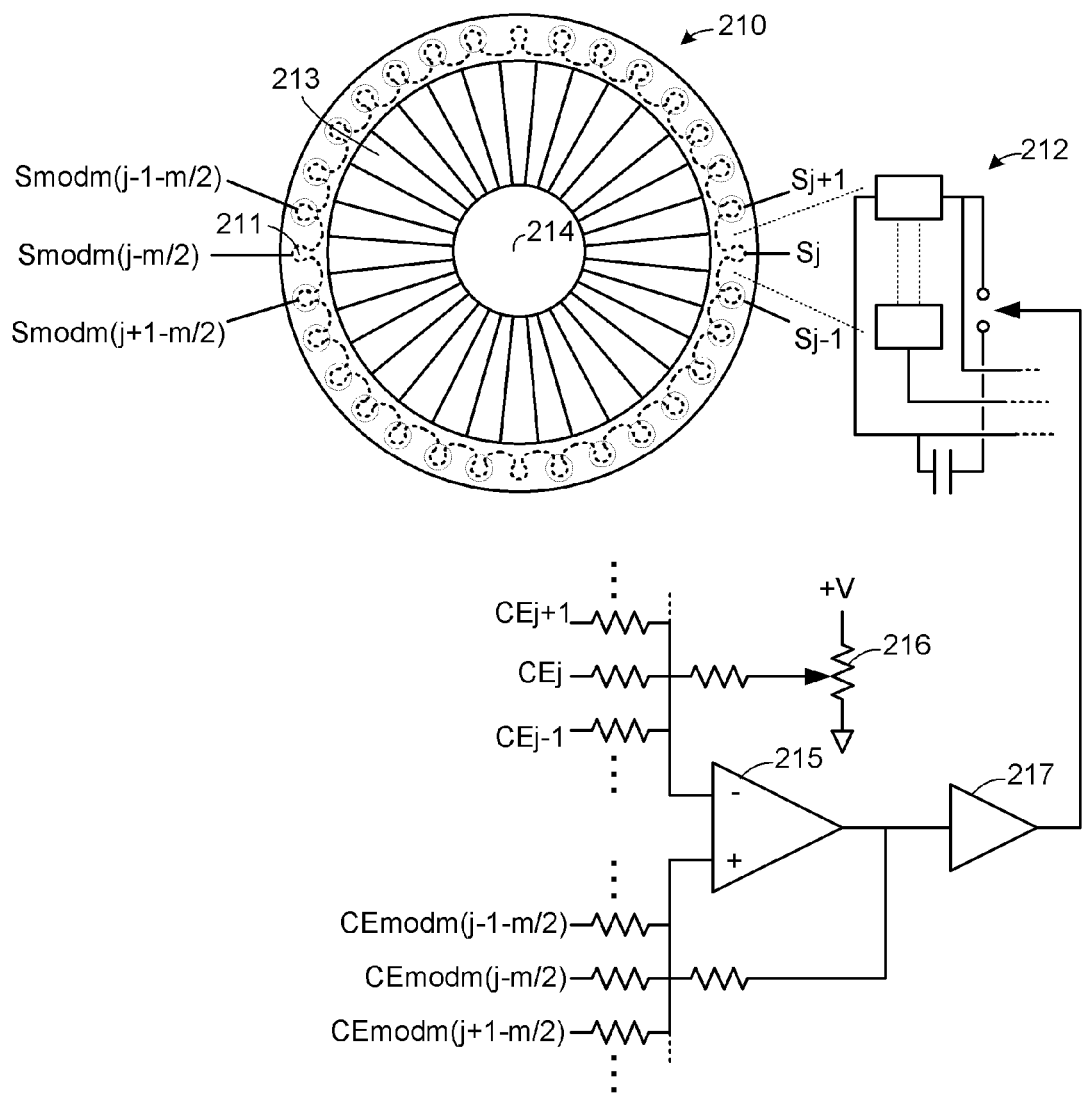
FIG. 23 is a schematic diagram of a circuit for command triggering of the opening of the plasma opening switches in an array on an as-needed basis.

If it is desired to achieve very fast opening of the plasma opening switches in the array, it may be necessary to use command triggering of at least some of the opening switches in the array. For some applications, this could be done in real time in response to the switch opening signals from the sync circuits in the data collection unit. As shown in FIG. 23, this could be done by triggering the opening of each plasma opening switch by a Schmidt trigger circuit when there has been a delay in the opening of the plasma opening switch relative to the plasma opening switches at diametrically opposite positions in a circular array. As shown in FIG. 23, the Schmidt trigger circuit includes a voltage comparator 215 and a trigger driver 217. The voltage comparator is responsive to an imbalance of the opening signals CE from the opening switches near to the opening switch controlled by the Schmidt trigger compared to the opening signals CE from the opening switches away from the opening switch controlled by the Schmidt trigger. The Schmidt trigger has a threshold that can be adjusted by a potentiometer 216.

Figure 24:
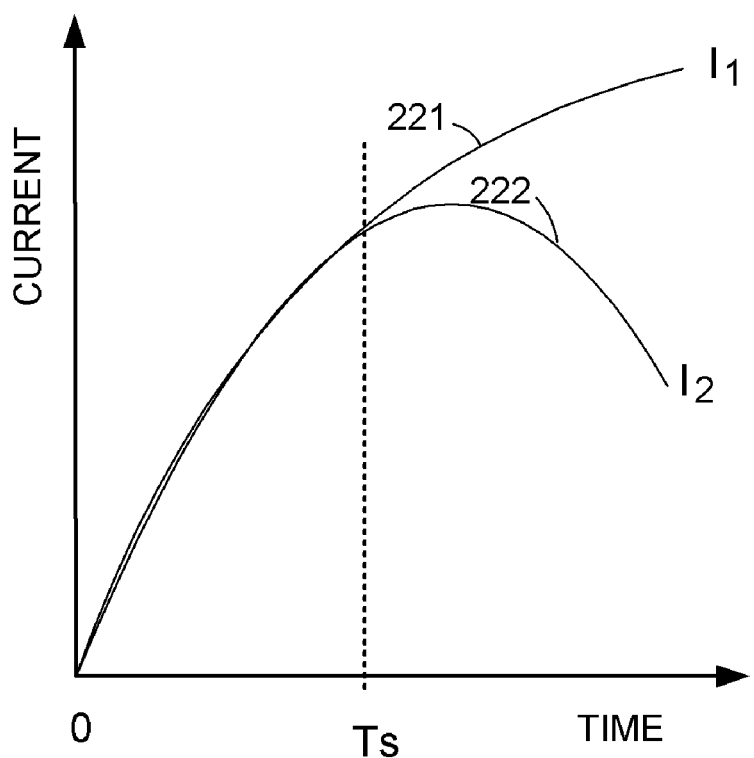
FIG. 24 shows graphs of current as a function of time for self-triggering of the plasma opening switch in FIG. 1 from a flux compression generator or compensated alternator.

FIG. 24 shows graphs of current as a function of time for self-triggering of the plasma opening switch in FIG. 1 from a flux compression generator or compensated alternator. As shown in FIG. 24, the first current component ($I_i$) is an increasing function of time when the second current component ($I_2$) is an increasing and then a decreasing function of time. Thus, at a time Ts at the beginning of a terminal portion of the power pulse, there begins to be an increasingly significant difference between first current and the second current in order to cause switching of the plasma opening switch from the closed state to the open state during the terminal portion of the power pulse.

Figure 25:
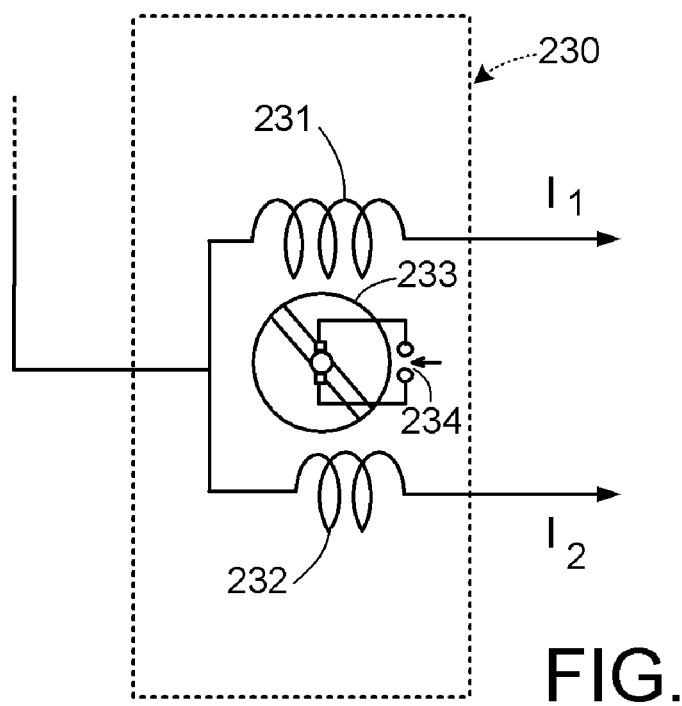
FIG. 25 shows a schematic diagram of a flux compression generator or compensated alternator for producing the current functions as shown in FIG. 24.

FIG. 25 shows a schematic diagram of a flux compression generator or compensated alternator 230 for producing the current functions as shown in FIG. 24. In this case the first current ($I_i$) provided from a first stator winding 231 of the flux compression generator or compensated alternator 230, and the second current ($I_2$) is provided from a second stator winding 232 of the flux compression generator or compensated alternator 230, when a switch 234 is closed. The stator windings 231, 232 have a spatial extent and relative phase placement to provide the desired current functions of FIG. 24.

Figure 26:
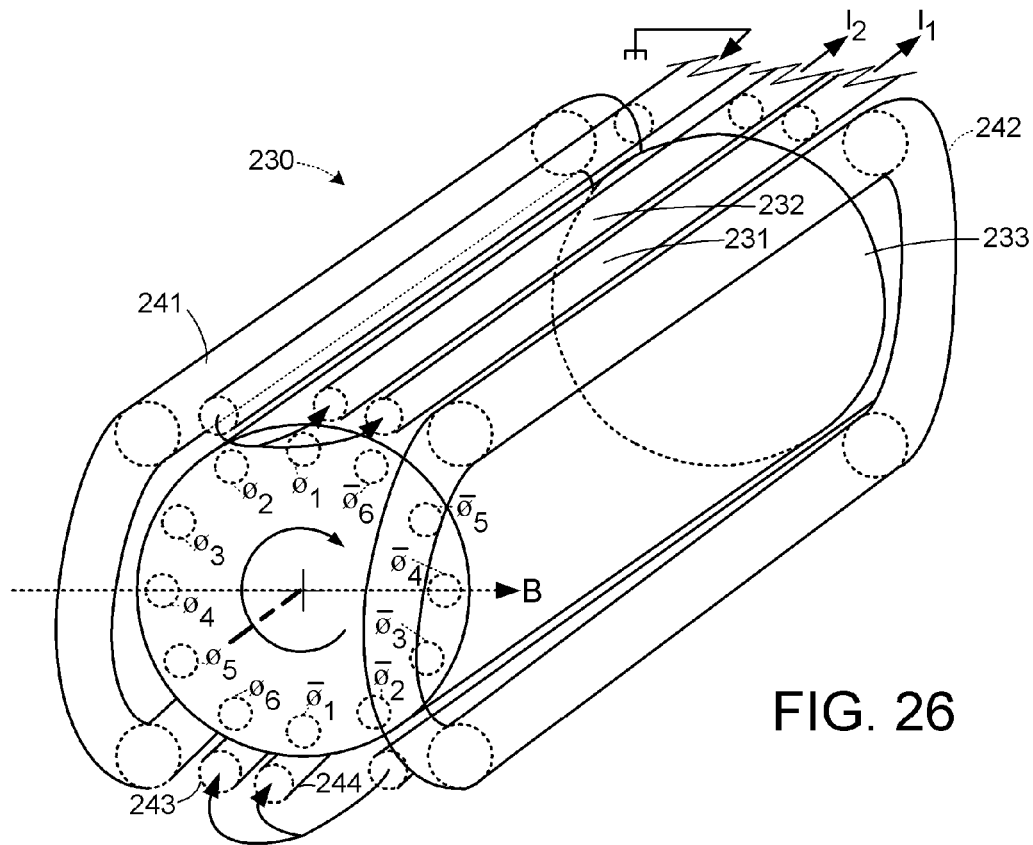
FIG. 26 shows a specific arrangement of armature, field, and output coils for a flux compression generator as introduced in FIG. 25.

FIG. 26 shows a specific arrangement of armature, field, and output coils for a flux compression generator 236 as introduced in FIG. 25. In FIG. 26, the armature and field coil configuration is that of a motor or generator having a two pole fixed field machine and a six phase armature 233. A similar configuration for more poles or more phases can be obtained by replicating the poles or phases show in FIG. 26. A pair of fixed field coils 241, 242 provides a horizontal excitation field (B). The output coils 231, 232 are also fixed and have a quadrature relationship with respect to the field coils 241, 242, although the output coil 242 for the second current ($I_2$) is somewhat advanced in phase relative to the output coil 241 for the first current ($I_i$) in order to provide the desired current functions of FIG. 24. There is a second pair of output coils 243, 244 on the bottom of the generator 230. The output coil 243, for example, is wired in parallel with the output coil 231, and the output coil 244 is wired in parallel with the output coil 232.

The armature has six phase windings designated as $\phi_1$, $\phi_2$, $\phi_3$, $\phi_4$, $\phi_5$, and $\phi_6$, which are complemented to designate the respective return side of each winding. Preferably there are six or more phases of armature windings and the number of such windings is an integer multiple of three, so that the windings can be grouped in to an integer number of three-phase winding triples. Use of multiple phases of armature windings will produce a substantially uniform power pulse upon shorting at least a majority of the phases that are aligned with the field coils. Thus, there is no need for armature phase synchronization of multiple generators in an array. Instead, the power pulses delivered by the generators can be synchronized by shoring the armature windings at computed times. The computed time for each generator also can be adjusted based on the measured velocity and phase of the armature as well as to compensate for any variation in the opening threshold for the plasma opening switch or switches fed by the generator.

Use of an integer multiple of three phase windings permits respective three phase thyristor bridges for natural or forced commutation for recovery of magnetic field energy into rotary mechanical energy after each power pulse. Each three-phase winding triple can have a separate delta or Y configuration and be isolated from the other winding triples, or they all can have a Y configuration and share a common central connection. In any case, when an armature winding is aligned with the output coil 231 or 232, the mutual inductance between the armature winding and the output coil is very nearly the inductance of the armature winding or output coil. Magnetic flux is caught in the armature winding when the armature winding is aligned with the field coils and then shorted. Then compression of this magnetic flux occurs when the armature and armature winding is rotated into alignment with the output coil.

Figure 27:
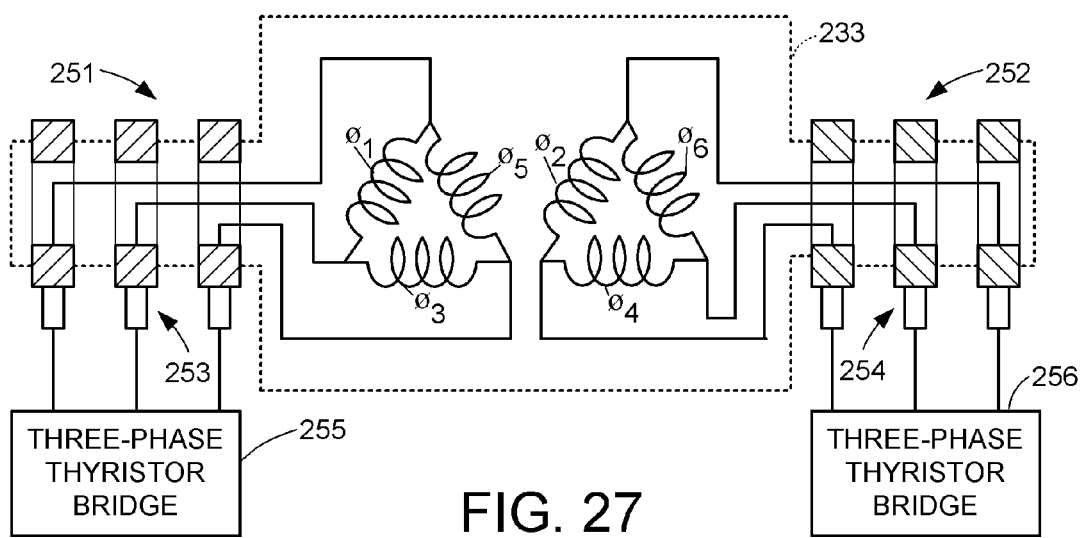
FIG. 27 shows a commutator for the flux compression generator as shown in FIG. 26.

FIG. 27 shows a commutator for the flux compression generator as shown in FIG. 26. In this case, the armature windings are grouped in to a first three-phase triple ($\phi_1$, $\phi_3$, and $\phi_5$) which is connected via a first set of slip rings 251 and bushes 253 to a first three-phase thyristor bridge 255, and a second three-phase triple ($\phi_2$, $\phi_4$, $\phi_5$, and $\phi_6$) which is connected via a second set of slip rings 252 and bushes 254 to a second three-phase thyristor bridge 256.

Figure 28:
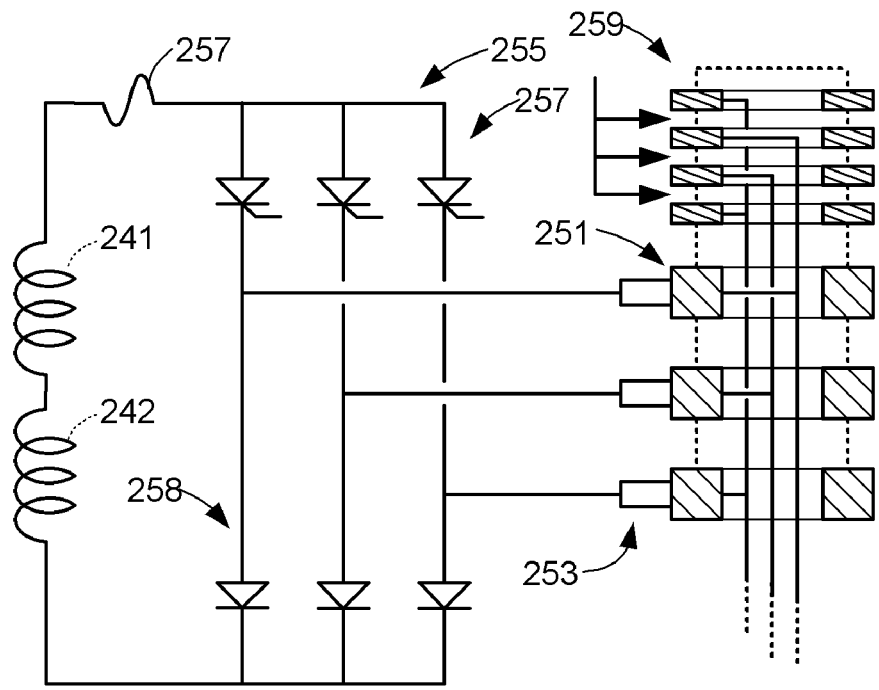
FIG. 28 shows a three-phase bridge circuit for using the flux compression generator of FIG. 26 in a single-shot mode.

FIG. 28 shows a three-phase bridge circuit for using the flux compression generator of FIG. 26 in a single-shot mode. The three-phase bridge 255 includes three thyristors 257, one for each phase, and three diodes 258, one for each phase. The thyristors in this case are silicon-controlled rectifiers. The thyristors 257 and 258 rectify alternating current from the armature 259 to provide direct current exciting the field windings 241, 242. A fuse 256 is wired in series with the field windings 241, 242 in order to provide an energy dump following a shot. When the armature 258 has been s brought up to speed, the thyristors 257 are turned on to begin charging of the field coils 241, 242. Once the field coils have been charged to a maximum magnetic field, a set of three rotating spark gaps 259 on the end of the shaft of the armature are activated to begin the output of a power pulse from the output windings (231, 232 in FIG. 26).

Figure 29:
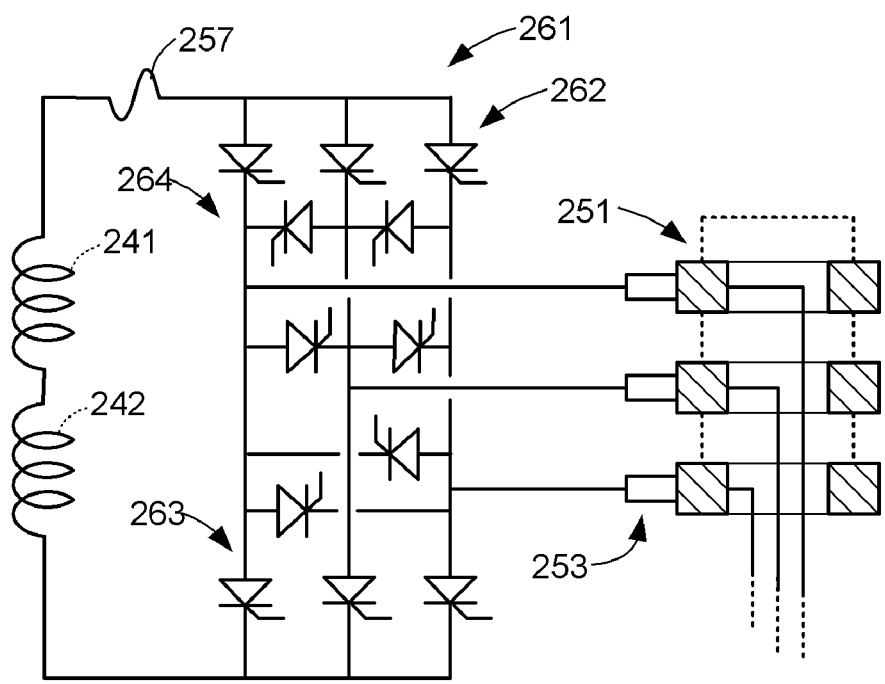
FIG. 29 shows a three-phase bridge circuit for using the flux compression generator of FIG. 26 in a repetitively pulsed mode.

FIG. 29 shows a three-phase bridge circuit for using the flux compression generator of FIG. 26 in a repetitively pulsed mode. In this case a thyristor bridge 261 includes three upper silicon controlled rectifiers 262, one for each phase, and three lower silicon rectifiers 263, one for each phase. In addition, six silicon controlled rectifiers 264 are provided for shorting each of the three phases to begin a power pulse. Because the bridge 261 includes the lower thyristors 263 instead of diodes, it is possible to recover energy at the end of the power pulse by converting the magnetic excitation field energy to rotary energy through active commutation of the thyristors 262 and 263, so long as the conduction phase angle of the thyristors is chosen sufficiently before the phase angle of maximum back EMF so that the maximum back EMF from the armature windings is sufficient to turn off each of the thyristors. Somewhat greater motor torque can be obtained by forced commutation, but the circuitry for forced commutation is more complex, for example, as shown in FIG. 30.

Figure 30:
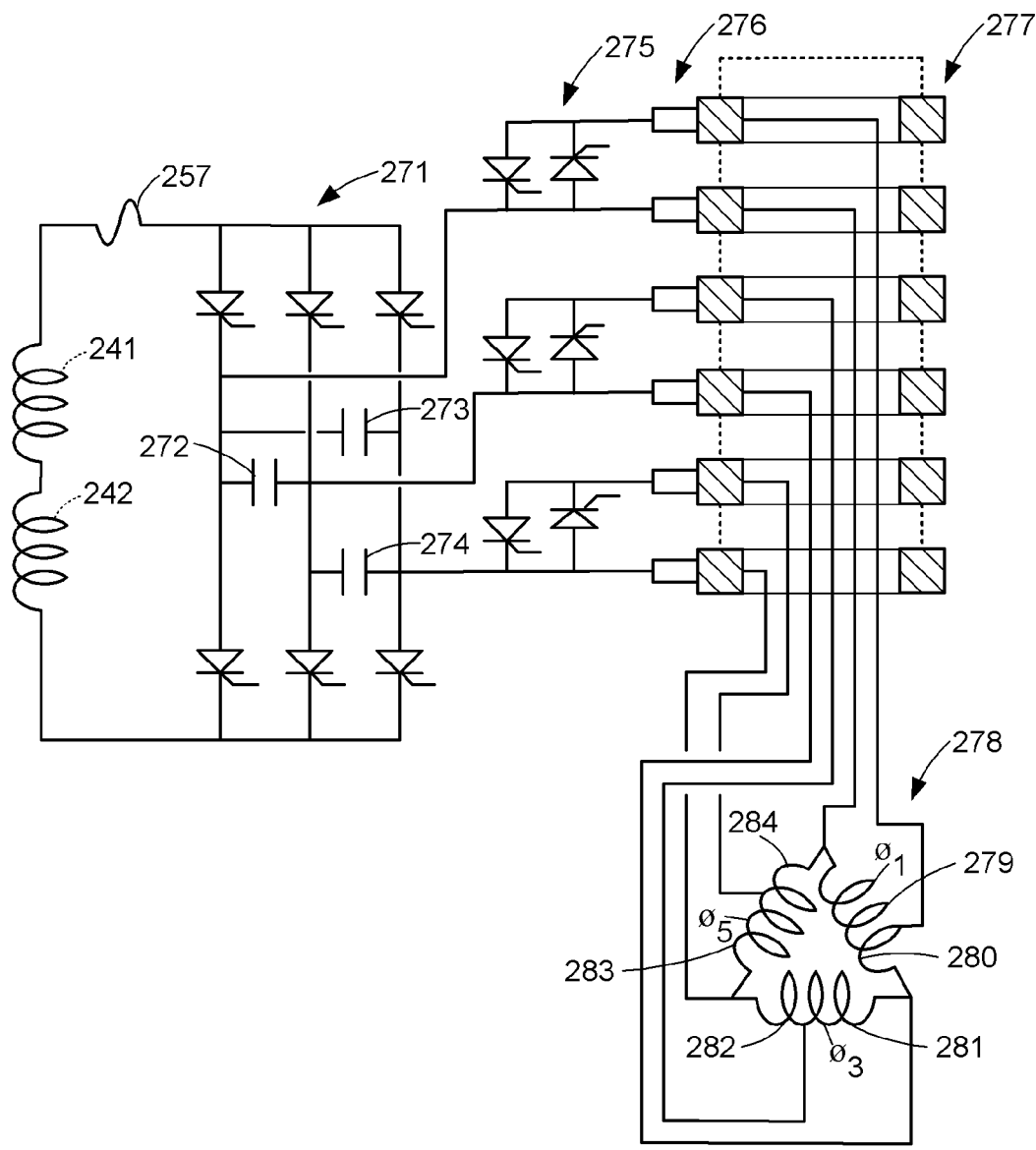
FIG. 30 shows a three-phase bridge circuit for using the flux compression generator of FIG. 26 in a repetitively pulsed mode for forced commutation for recovery of magnetic field energy after each shot.

FIG. 30 shows a three-phase bridge circuit for using the flux compression generator of FIG. 26 in a repetitively pulsed mode for forced commutation for more efficient recovery of magnetic field energy after each shot. In this case the thyristor bridge 271 includes an upper and a lower silicon controlled rectifier for each phase. A respective snubber, such as a silicon carbide varistor, could be wired in parallel with each of these silicon controlled rectifiers, in order to suppress transients from the forced commutation process. In addition, a respective commutation capacitor 272, 273, 274 shunts each respective phase. In order to limit discharge current from the commutation capacitors when the armature windings are shorted to begin a power pulse, the armature phase windings are tapped so that an outer layer (279, 281, 283) of each winding is shorted but an inner layer (280, 282, 283) of each winding is not shorted. Thus, the inner layer of each winding limits the discharge current of its respective commutation capacitor, because the discharge current must flow through the inner winding. The outer layer rather than the inner layer is shorted because the outer layer has higher mutual inductance with the output coils. The brushes 276 and slip rings 277 include three additional brushes and slip rings so that the thyristors 275 for shorting the outer layers of the armature windings can still be stationary. The thyristors 275 could be mounted inside a hollow armature shaft so that additional high-current brushes would not be needed.

In view of the above, there has been described various methods for pulsed power generation and control of plasma opening switches in a repetitive pulsed power system using inductive energy storage.

What is claimed is:

1. A method of operating an array of plasma opening switches for pulsed power from inductive energy storage, comprising:
    (a) measuring respective opening times for the plasma opening switches during a first discharge of pulsed power from the inductive energy storage; and then
    (b) adjusting sources of current to the plasma opening switches in response to the measured opening times for the plasma opening switches; and then
    (c) obtaining a second discharge of pulsed power from the inductive energy storage.

2. The method as claimed in claim 1, wherein the step (b) of adjusting of the sources of current to the plasma opening switches in response to the measured opening times during the first discharge of pulsed power from the inductive energy storage is performed by adjusting a charging voltage of a respective capacitor bank for each plasma opening switch.

3. The method as claimed in claim 2, wherein the respective capacitor bank includes a first capacitor providing a first current tending to open said each plasma opening switch and a second capacitor providing a second current tending to close said each plasma opening switch, wherein the first capacitor is shunted by at least one crowbar diode, and the second capacitor is not shunted by a crowbar diode.

4. The method as claimed in claim 1, wherein the step (b) of adjusting of the sources of current to the plasma opening switches in response to the measured opening times during the first discharge of pulsed power from the inductive energy storage is performed by adjusting a respective variable resistor in series with a current source to each of the plasma opening switches.

5. The method as claimed in claim 4, wherein the inductive energy storage provides a first source of current to each plasma opening switch tending to open said each plasma opening switch, and a second source of current to said each plasma opening switch tending to close said each plasma opening switch, and the respective variable resistor is in series with the respective second source of current to said each plasma opening switch.

6. The method as claimed in claim 4, wherein the current source to said each of the plasma opening switches includes a respective secondary winding on an inductive energy storage transformer.

7. The method as claimed in claim 4, wherein the current source to said each of the plasma opening switches includes a respective winding on a compensated alternator.

8. The method as claimed in claim 7, wherein the current source to said each of the plasma opening switches includes a respective winding on each of a plurality of compensated alternators, the respective windings being connected in parallel.

9. The method as claimed in claim 1, wherein the respective current sources for the plasma opening switches in the array are all wired in series with the plasma opening switches so that the same current is supplied to each of the plasma opening switches when the plasma opening switches are closed.

10. The method as claimed in claim 1, wherein the respective current sources for the plasma opening switches in the array are all wired in series with the plasma opening switches so that all of the plasma opening switches initially switch from an open state to a closed state at substantially the same time.

11. The method as claimed in claim 1, wherein the step (a) of measuring respective opening times for the plasma opening switches during a first discharge of pulsed power from the inductive energy storage includes receiving a respective pulse of light in a data collection unit from each of the plasma opening switches in the array, and the data collection unit recording a time of receipt of the respective pulse of light from said each of the plasma opening switches in the array.

12. The method as claimed in claim 1, which further includes command triggered opening of plasma opening switches in the array in real time for a second shot as needed in response to asymmetry of opening times of the plasma opening switches in the array during the second shot.

13. A pulsed power system comprising:
a pulsed power supply;
a load connected to the pulsed power supply for receiving power from the pulsed power supply; and
a plasma opening switch connected between the pulsed power supply and the load,
wherein the pulsed power supply produces a first current and a second current during a power pulse, and the pulsed power supply produces a difference between the first current and the second current during a terminal portion of a power pulse; and
wherein the plasma opening switch has a closed state in which the plasma opening switch shunts the first current and the second current from the pulsed power supply so that the first current and the second current are not delivered to the load, and the plasma opening switch has an open state in which the plasma opening switch delivers the first current and the second current to the load, and the plasma opening switch switches from the closed state to the open state in response to the difference between the first current and the second current.

14. The pulsed power system as claimed in claim 13, wherein the pulsed power supply includes a first capacitor for providing the first current by discharging the first capacitor, and a second capacitor for providing the second current by discharging the second capacitor, and a crowbar switch connected to the first capacitor for shorting the first capacitor at the beginning of the terminal portion of the power pulse in order to produce the difference between the first current and the second current during the terminal portion of the power pulse.

15. The pulsed power system as claimed in claim 14, wherein the crowbar switch is a semiconductor diode.

16. The pulsed power system as claimed in claim 13, wherein the pulsed power system includes a flux compression generator having a stationary excitation field coil, a rotary armature including at least one armature coil, a first stationary output coil for providing the first current when said at least one armature coil is shorted, and a second stationary output coil for producing the second current when said at least one armature coil is shorted.

17. The pulsed power system as claimed in claim 16, which includes a rotary spark gap switch mounted to the rotary armature and connected to said at least one armature coil for shorting said at least one armature coil.

18. The pulsed power system as claimed in claim 16, wherein the armature includes multiple phase windings for at least three phases, and switches for shoring the multiple phase windings to produce the power pulse at a selected point in time independent of phase of rotation of the armature.

19. The pulsed power system as claimed in claim 16, wherein the armature includes multiple phase windings, and the pulsed power supply includes a commutator connecting the multiple phase windings to the stationary excitation field coil for excitation of the stationary field coil.

20. The pulsed power system as claimed in claim 19, wherein the commutator includes slip rings, brushes, and semiconductor thyristor bridges,
the armature windings include at least six phases of windings, and
the thyristor bridges include at least two three-phase bridges, and each of the two three-phase bridges has three commutation capacitors for forced commutation after the terminal portion for recovery of excitation field energy by conversion of the excitation field energy to mechanical energy of the rotary armature.

* * * * *